US011887443B2

(12) United States Patent
Marks et al.

(10) Patent No.: US 11,887,443 B2
(45) Date of Patent: Jan. 30, 2024

(54) SYSTEMS AND METHODS FOR PLAYING A WAGERING GAME IN WHICH SYMBOLS ARE POPULATED FROM ONE OR MORE REELS TO BINGO CARDS

(71) Applicant: Aristocrat Technologies, Inc., Las Vegas, NV (US)

(72) Inventors: Daniel Marks, Decatur, GA (US); Hua Xu, Marietta, GA (US); Lokesh Jain, Delhi (IN); Ashish Bhandari, Cumming, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 17/708,903

(22) Filed: Mar. 30, 2022

(65) Prior Publication Data

US 2023/0316871 A1 Oct. 5, 2023

(51) Int. Cl.
*G07F 17/32* (2006.01)

(52) U.S. Cl.
CPC ...... *G07F 17/3293* (2013.01); *G07F 17/3213* (2013.01); *G07F 17/3244* (2013.01)

(58) Field of Classification Search
CPC ................................. G07F 17/32; G07F 17/34
USPC ............................................................ 463/20
See application file for complete search history.

(56) References Cited

U.S. PATENT DOCUMENTS 5,393,057 A 2/1995 Marnell, II
5,482,289 A 1/1996 Weingardt
5,647,798 A 7/1997 Falciglia
5,935,002 A 8/1999 Falciglia
6,398,645 B1 6/2002 Yoseloff
6,461,241 B1 10/2002 Webb
6,572,472 B1 6/2003 Glavich
6,609,973 B1 8/2003 Weiss
6,656,044 B1 12/2003 Lewis
6,764,398 B2 7/2004 Stone
6,840,858 B2 1/2005 Adams
7,291,066 B2 11/2007 Gauselmann
7,575,514 B2 8/2009 Cuddy
(Continued)

OTHER PUBLICATIONS

Office Action dated Feb. 6, 2023 for U.S. Appl. No. 29/816,269 (pp. 1-7).

(Continued)

*Primary Examiner* — Pierre E Elisca
(74) *Attorney, Agent, or Firm* — Armstrong Teasdale LLP

(57) ABSTRACT

An electronic gaming machine that includes a display device, a memory device, and a processor. The processor configured to control the display device to display a matrix of symbol positions formed by a plurality of reels and display a first bingo card and a second bingo card wherein the first bingo card includes a first feature indicator and the second bingo card includes a second feature indicator, store in the memory device a first memory structure corresponding to the first bingo card and a second memory structure corresponding to the second bingo card, and in response to determining that a first prize symbol indicator of a first prize symbol displayed in the matrix of symbol positions corresponds to a combination of the first feature indicator and the second feature indicator, populate a position on each of the first bingo card and the second bingo card with the first prize symbol.

20 Claims, 15 Drawing Sheets

(56) References Cited

U.S. PATENT DOCUMENTS

| | | | | |
|---|---|---|---|---|
| 7,686,686 | B2 | 3/2010 | Marks | |
| 7,853,188 | B2 * | 12/2010 | Watanabe | G03G 15/0194 430/125.33 |
| D648,344 | S | 11/2011 | Arnold | |
| 8,128,478 | B2 | 3/2012 | Meyer | |
| 8,241,103 | B2 | 8/2012 | Yarbrough | |
| 8,257,162 | B2 | 9/2012 | Saito | |
| 8,287,364 | B2 | 10/2012 | Caputo | |
| 8,425,303 | B2 | 4/2013 | Kennedy | |
| 8,647,196 | B1 | 2/2014 | Colvin | |
| D711,401 | S | 8/2014 | Hartley | |
| 9,251,667 | B2 | 2/2016 | Marks | |
| D770,468 | S | 11/2016 | Carlson | |
| D770,469 | S | 11/2016 | Carlson | |
| D772,889 | S | 11/2016 | Carlson | |
| D775,651 | S | 1/2017 | Jin | |
| D787,543 | S | 5/2017 | Qiu | |
| D789,397 | S | 6/2017 | Lee | |
| D800,749 | S | 10/2017 | Jungmann | |
| D839,304 | S | 1/2019 | Penacho | |
| D840,429 | S | 2/2019 | Kroon | |
| 10,269,217 | B2 | 4/2019 | Nakamura | |
| D849,765 | S | 5/2019 | Lee | |
| 10,410,476 | B2 | 9/2019 | Berman | |
| 10,453,306 | B2 | 10/2019 | Crisping | |
| 10,475,287 | B1 | 11/2019 | Däumling | |
| 10,789,812 | B2 | 9/2020 | Sanborn | |
| D900,127 | S | 10/2020 | Visser | |
| 10,861,287 | B2 | 12/2020 | Nakamura | |
| D918,237 | S | 5/2021 | Lee | |
| D918,241 | S | 5/2021 | Sheridan | |
| D922,409 | S | 6/2021 | Visser | |
| D926,785 | S | 8/2021 | Carlson | |
| 11,183,018 | B2 | 11/2021 | Marks | |
| D949,167 | S | 4/2022 | Marks | |
| D970,522 | S | 11/2022 | Han | |
| 11,514,757 | B2 | 11/2022 | Casey | |
| D973,696 | S | 12/2022 | Ludwick | |
| 11,605,262 | B2 | 3/2023 | Shiraishi | |
| 2002/0045472 | A1 | 4/2002 | Adams | |
| 2002/0177478 | A1 | 11/2002 | Glasson | |
| 2004/0152510 | A1 | 8/2004 | Herrmann | |
| 2004/0266509 | A1 | 12/2004 | Bennett | |
| 2005/0059468 | A1 * | 3/2005 | Cannon | G07F 17/3225 463/19 |
| 2005/0059471 | A1 * | 3/2005 | Cannon | G07F 17/3267 463/19 |
| 2005/0064932 | A1 * | 3/2005 | Cannon | G07F 17/3286 463/19 |
| 2005/0075161 | A1 * | 4/2005 | McGlone | G07F 17/329 463/19 |
| 2006/0025199 | A1 | 2/2006 | Harkins | |
| 2006/0084491 | A1 | 4/2006 | DiCarlo | |
| 2006/0160603 | A1 | 7/2006 | Lulek | |
| 2006/0252493 | A1 | 11/2006 | Tribout, Jr. | |
| 2007/0226314 | A1 | 9/2007 | Eick | |
| 2007/0232379 | A1 | 10/2007 | Falciglia | |
| 2010/0120489 | A1 | 5/2010 | Meyer | |
| 2010/0203945 | A1 | 8/2010 | Pitocchelli | |
| 2010/0205559 | A1 | 8/2010 | Rose | |
| 2011/0028201 | A1 | 2/2011 | Warner | |
| 2011/0117989 | A1 | 5/2011 | Kennedy | |
| 2011/0265041 | A1 | 10/2011 | Ganetakos | |
| 2012/0231868 | A1 | 9/2012 | Guinn | |
| 2012/0270631 | A1 | 10/2012 | Graves | |
| 2013/0065665 | A1 | 3/2013 | Watkins | |
| 2013/0157741 | A1 | 6/2013 | Pacey | |
| 2014/0057702 | A1 * | 2/2014 | Lowell | G07F 17/3244 463/25 |
| 2014/0364193 | A1 | 12/2014 | Williamson | |
| 2015/0141114 | A1 | 5/2015 | Davis | |
| 2015/0248807 | A1 | 9/2015 | Berman | |
| 2016/0104344 | A1 | 4/2016 | Meyer | |
| 2016/0117884 | A1 | 4/2016 | Weingardt | |
| 2016/0307410 | A1 * | 10/2016 | Cannon | G07F 17/3225 |
| 2017/0053496 | A1 | 2/2017 | Borissov | |
| 2017/0092073 | A1 | 3/2017 | Nakamura | |
| 2018/0151032 | A1 | 5/2018 | Nakamura | |
| 2019/0073859 | A1 | 3/2019 | Penacho | |
| 2019/0180555 | A1 | 6/2019 | Elias | |
| 2019/0206194 | A1 | 7/2019 | Nakamura | |
| 2019/0236900 | A1 | 8/2019 | Pau | |
| 2020/0051390 | A1 | 2/2020 | Jackson | |
| 2020/0273293 | A1 | 8/2020 | Sanborn | |
| 2020/0294358 | A1 | 9/2020 | Narra | |
| 2021/0043038 | A1 | 2/2021 | Marks | |
| 2021/0056810 | A1 | 2/2021 | La Guardia | |
| 2021/0183199 | A1 | 6/2021 | Uss | |
| 2021/0248864 | A1 | 8/2021 | Marks | |
| 2022/0012977 | A1 | 1/2022 | Imutan | |
| 2022/0076530 | A1 | 3/2022 | Marks | |
| 2022/0114862 | A1 | 4/2022 | Marks | |

OTHER PUBLICATIONS

Office Action (Non-Final Rejection) dated Mar. 2, 2023 for U.S. Appl. No. 17/526,572 (pp. 1-20).

Office Action (Non-Final Rejection) dated Mar. 2, 2023 for U.S. Appl. No. 17/559,523 (pp. 1-15).

Office Action dated Mar. 14, 2023 for U.S. Appl. No. 29/816,274 (pp. 1-7).

“ProPlayer” Aug. 25, 2018, posted at egsol.com, [site visited Mar. 8, 2023]. https://web.archive.org/web/20180825131344/https:// egsol.com/portfolio-items/proplayer (Year: 2018).

“Bingo Bash—HTML5 Game” Nov. 13, 2017, posted at codecanyon.net, [site visited Mar. 8, 2023]. https://web.archive.org/ |web/ 20171113125403/https://codecanyon.net/item/bingo-bash-html5-game/20828675 (Year: 2017).

“Letters2Friends” Aug. 1, 2013, posted at facebook.com, [site visited Mar. 8, 2023]. https://www.facebook.com/photo/?fbid= 610077119036414&set=ecnf.100079467944867 (Year: 2013).

Office Action dated Oct. 5, 2020 for U.S. Appl. No. 16/531,904 (pp. 1-18).

Office Action dated Mar. 30, 2021 for U.S. Appl. No. 16/531,904 (pp. 1-16).

Office Action dated Oct. 1, 2021 for U.S. Appl. No. 29/736,079 (pp. 1-7).

Taylor, Jiny, “Bingo @ DoulbeU Casino” Apr. 25, 2013, posted at youtube.com, [site visited Sep. 27, 2021]. https://www.youtube.com/watch?v=c22qBgdPUF8 (Year: 2013).

Notice of Allowance dated Dec. 14, 2021 for U.S. Appl. No. 29/736,079 (pp. 1-6).

Office Action dated Oct. 1, 2021 for U.S. Appl. No. 29/736,080 (pp. 1-7).

Office Action (Notice of Allowance and Fees Due (PTOL-85)) dated Jul. 26, 2021 for U.S. Appl. No. 16/531,904 (pp. 1-8).

Notice of Allowance dated Dec. 9, 2021 for U.S. Appl. No. 29/736,080 (pp. 1-6).

Office Action (Final Rejection) dated Jun. 7, 2023 for U.S. Appl. No. 17/526,572 (pp. 1-12).

Office Action (Notice of Allowance and Fees Due (PTOL-85)) dated Jun. 14, 2023 for U.S. Appl. No. 17/559,523 (pp. 1-10).

Notice of Allowance dated Jun. 14, 2023 for U.S. Appl. No. 29/816,269 (pp. 1-7).

“How to play Bingo on a electronic machine” Feb. 14, 2019, posted at youtube.com, [site visited May 31, 2023]. http (Year: 2019 ).

“Theme Types” Jan. 28, 2017, posted at tmfu-bingo.livejournal.com, [site visited May 31, 2023]. https://tmfu-bingo.livejournal.com /859.html (Year: 2017).

Notice of Allowance dated Aug. 7, 2023 for U.S. Appl. No. 29/816,274 (pp. 1-7).

* cited by examiner

SYSTEMS AND METHODS FOR PLAYING A WAGERING GAME IN WHICH SYMBOLS ARE POPULATED FROM ONE OR MORE REELS TO BINGO CARDS

CROSS-REFERENCE TO RELATED APPLICATIONS

The present application is related to U.S. patent application Ser. No. 17/559,523, filed Dec. 22, 2021, which is a continuation of U.S. patent application Ser. No. 17/526,572, filed Nov. 15, 2021, which is a continuation of U.S. patent application Ser. No. 16/531,904, filed Aug. 5, 2019, now U.S. Pat. No. 11,183,018, all of which are incorporated herein by reference in their entirety.

TECHNICAL FIELD

The field of disclosure relates generally to electronic gaming, and more particularly, to systems and methods for playing a wagering game, in which one or more symbols (such as one or more prize symbols or one or more jackpot symbols) are replicated or populated from one or more reel positions of one or more reels to one or more corresponding bingo positions of two or more bingo cards.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

In one aspect, an electronic gaming device is provided. The electronic gaming device includes a display device, a memory device, and a processor configured to execute instructions stored in the memory device. The processor configured to control the display device to display a matrix of symbol positions formed by a plurality of reels wherein each reel of the plurality of reels including a plurality of symbol positions and the matrix of symbol positions define a primary play area, control the display device to display a first bingo card and a second bingo card defining a secondary play area wherein the first bingo card is associated with a first feature indicator and the second bingo card is associated with a second feature indicator, store a first memory structure in the memory device corresponding to the first bingo card and a second memory structure in the memory device corresponding to the second bingo card, and in response to receipt of an input to play an instance of a game, determine an outcome, based at least in part on an output of a random number generator (RNG), that includes a first plurality of symbols to display in the primary play area. The processor is further configured to in response to determining that the first plurality of symbols includes a first prize symbol having a first prize symbol indicator and a value, determine whether the first prize symbol indicator of the first prize symbol corresponds to the first feature indicator, the second feature indicator, or a combination of the first feature indicator and second feature indicator; in response to determining that the first prize symbol indicator corresponds to the first feature indicator, update the first memory structure to include a prize value that corresponds to the value of the first prize symbol and populate a position on the first bingo card with the first prize symbol; in response to determining that the first prize symbol indicator corresponds to the second feature indicator, update the second memory structure to include a prize value that corresponds to the value of the first prize symbol and populate a position on the second bingo card with the first prize symbol; and in response to determining that the first prize symbol indicator corresponds to the combination of the first feature indicator and the second feature indicator, populate a position on each of the first bingo card and the second bingo card with the first prize symbol.

In another aspect, an electronic gaming system is provided. The electronic gaming system includes at least one memory device with instructions stored thereon and at least one processor in communication with the at least one memory device. The instructions, when executed by the at least one processor, cause the at least one processor to provide content for a plurality of symbol positions formed by a plurality of reels, each reel of the plurality of reels including a plurality of symbol positions, the symbol positions defining a first area and provide content for a first bingo card and a second bingo card defining a second area, the first bingo card being associated with a first feature indicator and the second bingo card being associated with a second feature indicator. The instructions also cause the at least one processor to store a first memory structure in the memory device corresponding to the first bingo card and a second memory structure in the memory device corresponding to the second bingo card, based upon receipt of an input to play an instance of a game, determine an outcome, based at least in part on an output of a random number generator (RNG), that includes a first plurality of symbols for the first area, and based upon determining that the first plurality of symbols includes a first symbol having a first symbol indicator and a value, determine whether the first symbol indicator of the first symbol corresponds to the first feature indicator, the second feature indicator, or a combination of the first feature indicator and second feature indicator. The instructions further cause the at least one processor to, based upon determining that the first symbol indicator corresponds to the first feature indicator, update the first memory structure to include a value that corresponds to the value of the first symbol and populate a position on the first bingo card with the first symbol, based upon determining that the first symbol indicator corresponds to the second feature indicator, update the second memory structure to include a value that corresponds to the value of the first symbol and populate a position on the second bingo card with the first symbol, and based upon determining that the first symbol indicator corresponds to the combination of the first feature indicator and the second feature indicator, populate a position on each of the first bingo card and the second bingo card with the first symbol.

In yet another aspect, a non-transitory computer-readable storage medium with instructions stored thereon is described. The instructions, in response to execution by at least one processor, cause the at least one processor to configure content for a plurality of symbol positions formed by a plurality of reels, each reel of the plurality of reels including a plurality of symbol positions, the symbol positions defining a first area, configure content for a first card and a second card defining a second area, the first card being associated with a first feature indicator and the second card being associated with a second feature indicator, and cause storage of a first data structure corresponding to the first card and a second data structure corresponding to the second card. The instructions also cause the at least one processor to, in response to receipt of an input to play an instance of a game, determine an outcome, based at least in part on an output from a random number generator (RNG), that includes a first plurality of symbols for the first area, in response to determining that the first plurality of symbols includes a first symbol having a first symbol indicator and a value, determine whether the first symbol indicator of the first symbol is associated with the first feature indicator, the second feature indicator, or a combination of the first feature indicator and second feature indicator. The instructions further cause the at least one processor to, in response to determining that the first symbol indicator is associated with the first feature indicator, update the first data structure to include a value that is associated with to the value of the first symbol and cause a position on the first card to be populated with the first symbol, in response to determining that the first symbol indicator corresponds to the second feature indicator, update the second data structure to include a value that corresponds to the value of the first symbol and cause a position on the second card to be populated with the first symbol, and in response to determining that the first symbol indicator is associated with the combination of the first feature indicator and the second feature indicator, cause a position on each of the first card and the second card to be populated with the first symbol.

BRIEF DESCRIPTION OF THE DRAWINGS

An example embodiment of the subject matter disclosed will now be described with reference to the accompanying drawings.

DETAILED DESCRIPTION

Systems and methods for playing a wagering game in which symbols (e.g., prize symbols or jackpot symbols) are replicated or populated from symbol positions of one or more reels to corresponding bingo positions of two or more adjacent bingo cards are described herein. In at least one embodiment, if a prize symbol, such as a symbol including a prize value, is displayed from the plurality of reels after spinning and stopping the plurality of reels, the prize symbol may be replicated or populated from the symbol position on the reels to the corresponding bingo position on the bingo cards. The bingo cards may include a first bingo card and a second bingo card, wherein the first bingo card includes a first feature indicator (e.g., a color) and the second bingo card includes a second feature indicator (e.g., a different color). The prize symbol may be a combination prize symbol, which may be a combination indicator that matches the first feature indicator of the first bingo card and the second feature indicator of the second bingo card. If the prize symbol is a combination prize symbol, then the prize value included on the prize symbol is transferred to the corresponding position on each of the two bingo cards. If one or both of those positions on the bingo cards already include a prize value, in some embodiments, the new prize value is added to the already present prize value or in some case the higher of two prize values is inserted in the position on the bingo card. Once a bingo win is achieved on one or both of the bingo cards (e.g., based on paytable stored in memory), the prize values displayed on the winning bingo card and/or the other bingo card is awarded to the player. As noted herein, although two bingo cards are shown and described, in other embodiments, more than two bingo cards (e.g., “n” bingo cards) could be used in game play.

As described above, after each spin of the reels, the bingo cards may be evaluated to determine whether the prize symbols populated thereon form any predefined winning patterns (e.g., diagonal patterns, straight line patterns, shaped patterns, and the like). If predefined winning patterns are formed on at least one of the bingo cards from the prize symbols, a secondary game award, such as an aggregate award determined by adding the values of each prize symbol in the pattern or some other designated pattern, may be provided to a player of the wagering game.

Figure 1:
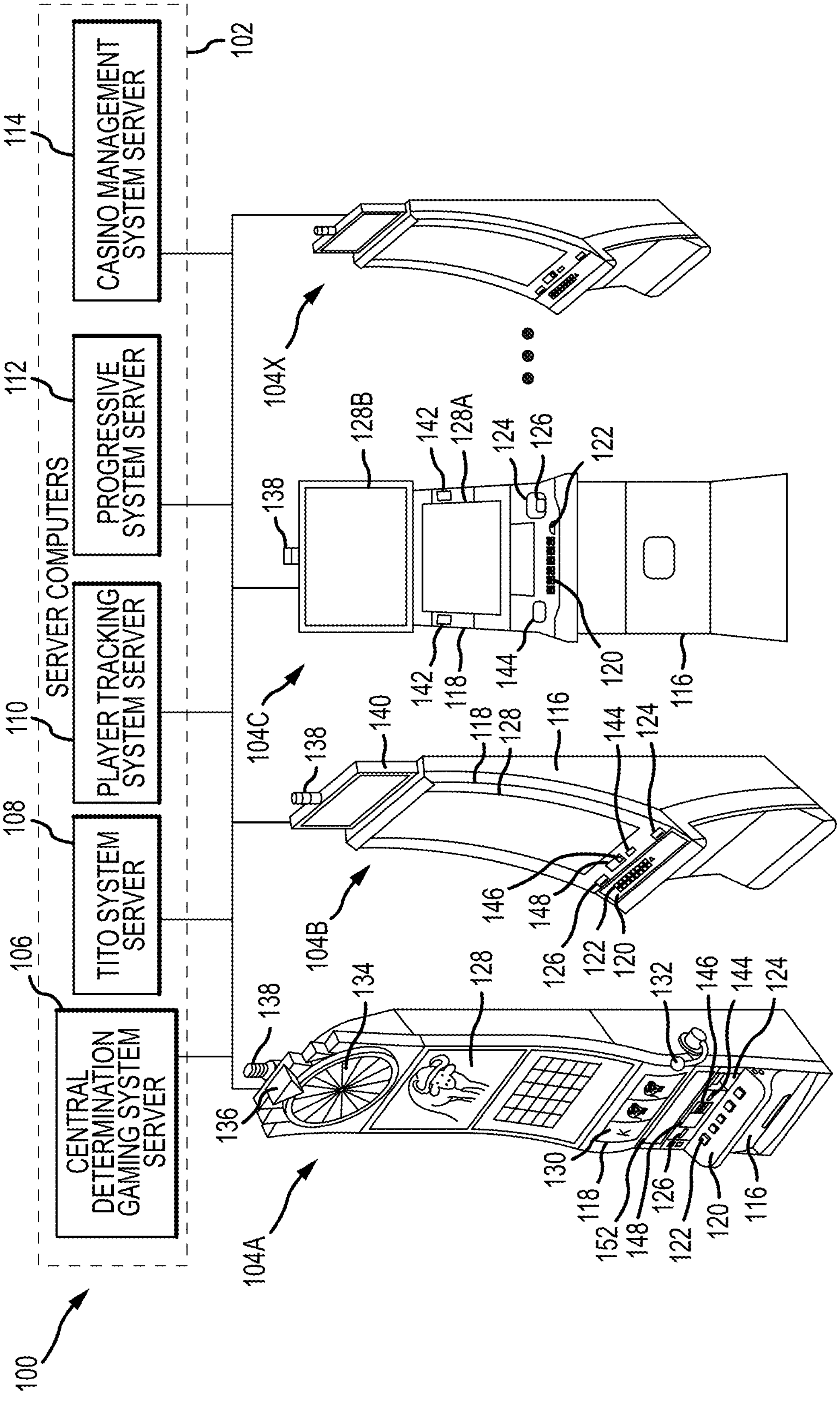
FIG. 1 is an example diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a “ticket-in” reader that allows the player to use a casino issued credit ticket to load credits onto the gaming device 104A (e.g., in a cashless ticket (“TITO”) system). In such cashless embodiments, the gaming device 104A may also include a “ticket-out” printer 126 for outputting a credit ticket when a “cash out” button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player’s smartphone, a keypad 146, and/or an illuminated display

148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
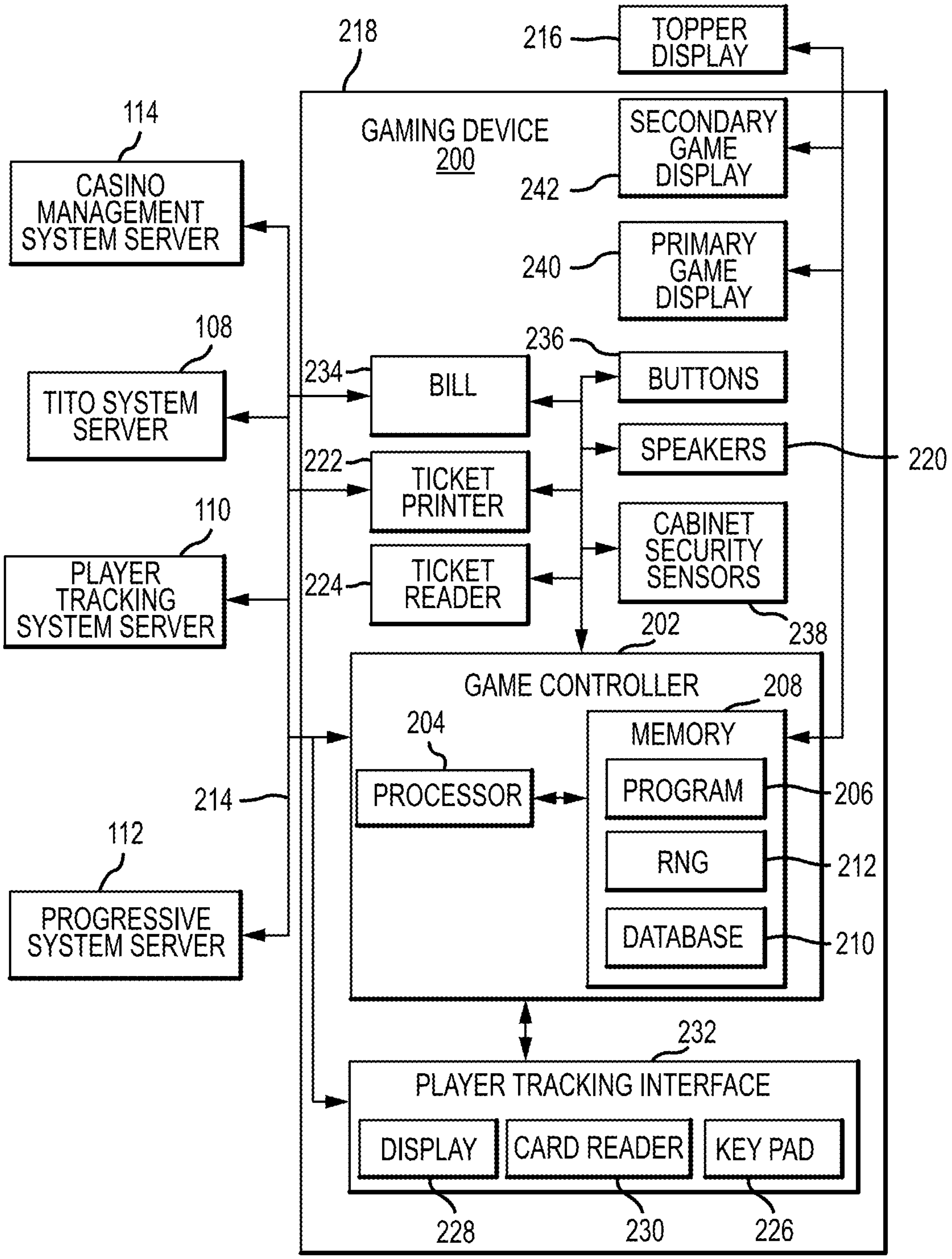
FIG. 2A is a block diagram showing various functional elements of an example EGM.

Many or all the above described components can be controlled by circuitry (e.g., a gaming controller) housed inside the main cabinet 116 of the gaming device 104A, the details of which are shown in FIG. 2A.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e., a play or round of the game) may be generated on a remote gaming device such as a central determination gaming system server 106 (not shown in FIG. 2A but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software/progressives and provide new technology in that they facilitate a cross-game or multi-game determination whether a player may be eligible to participate in a progressive award determination and/or whether to award a progressive jackpot. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking interface display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 2B:
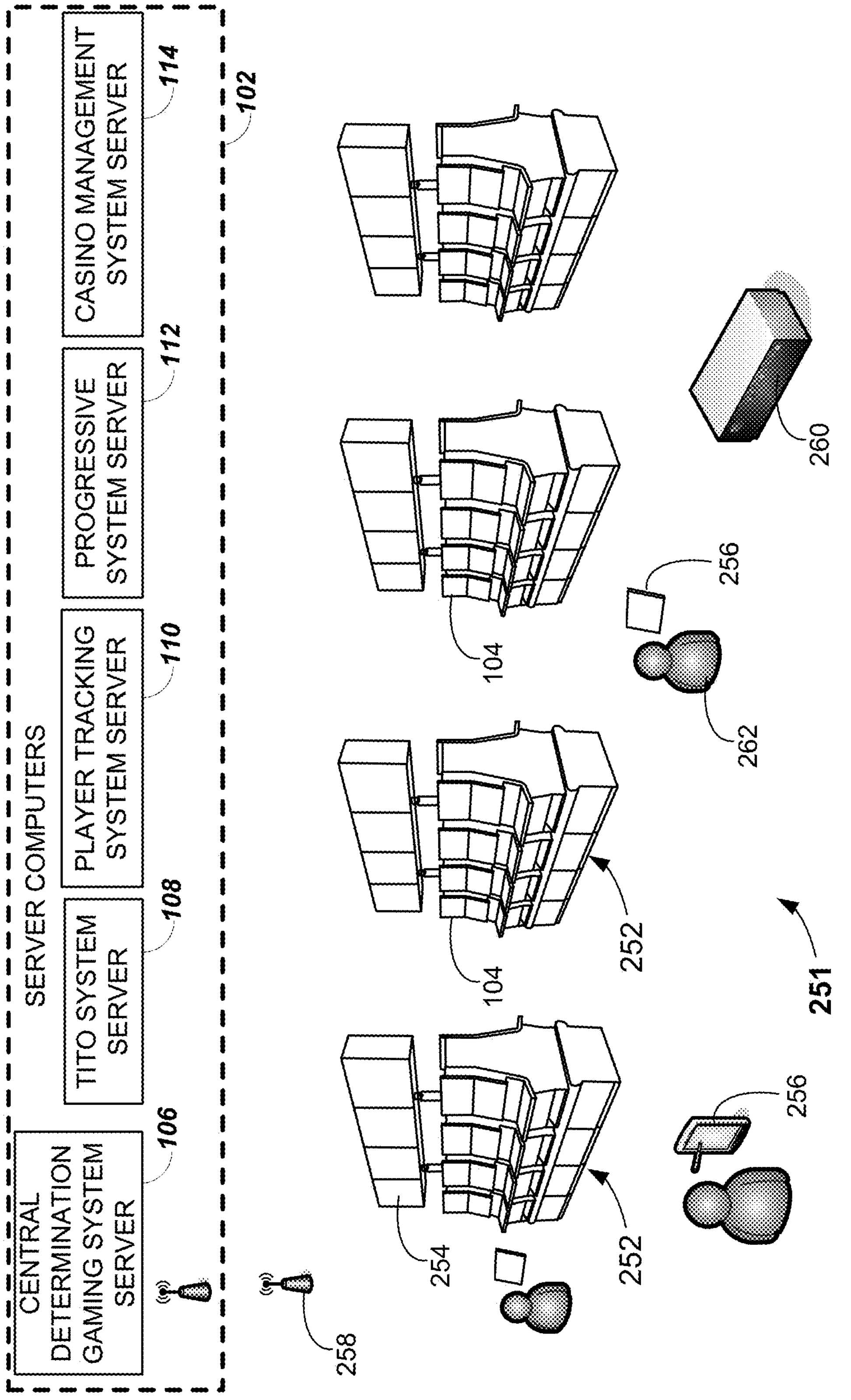
FIG. 2B depicts a casino gaming environment according to one example embodiment.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
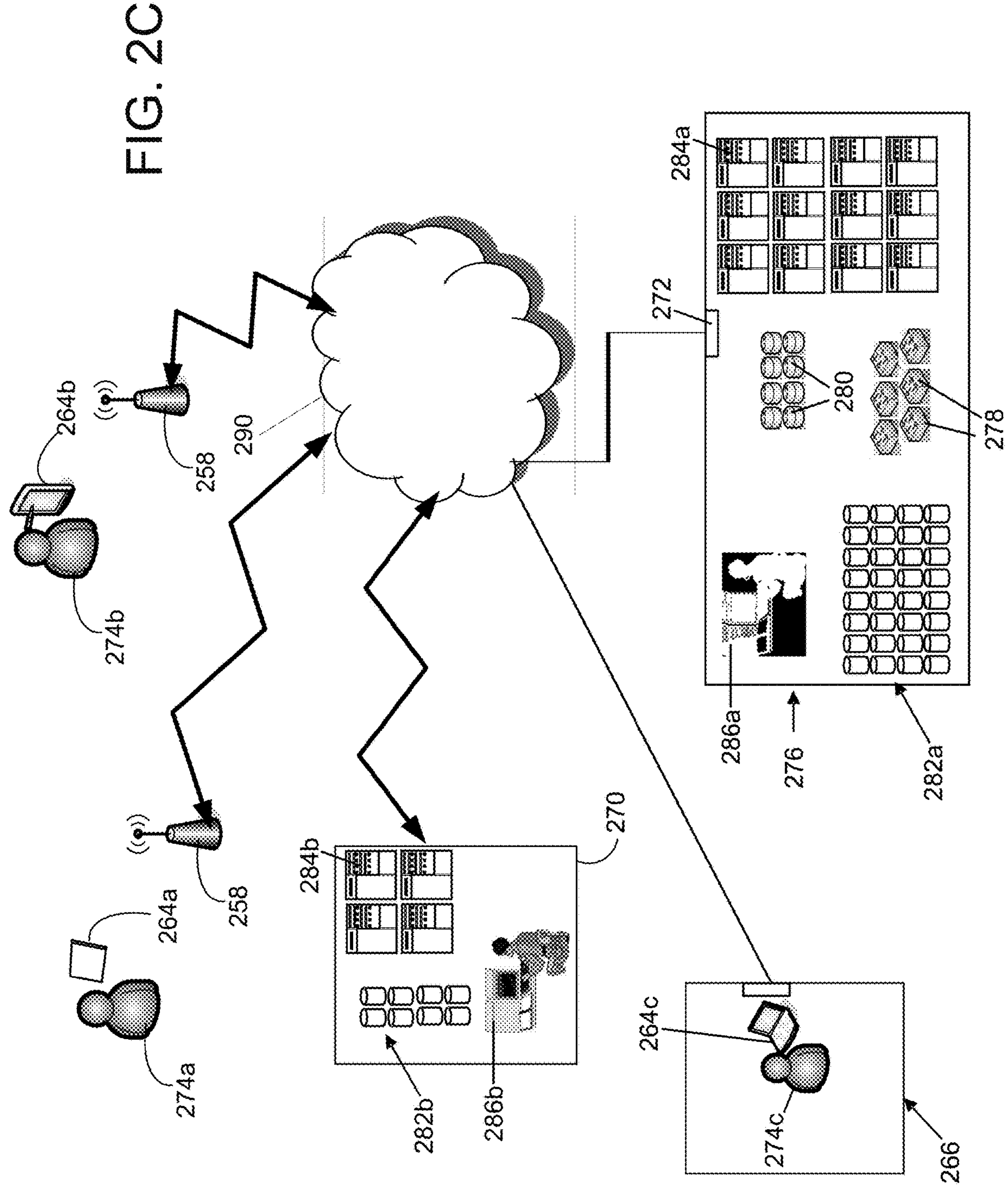
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 290. The networks 290 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 290. The gaming data center 276 is capable of communication with the networks 290 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 290. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 290. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
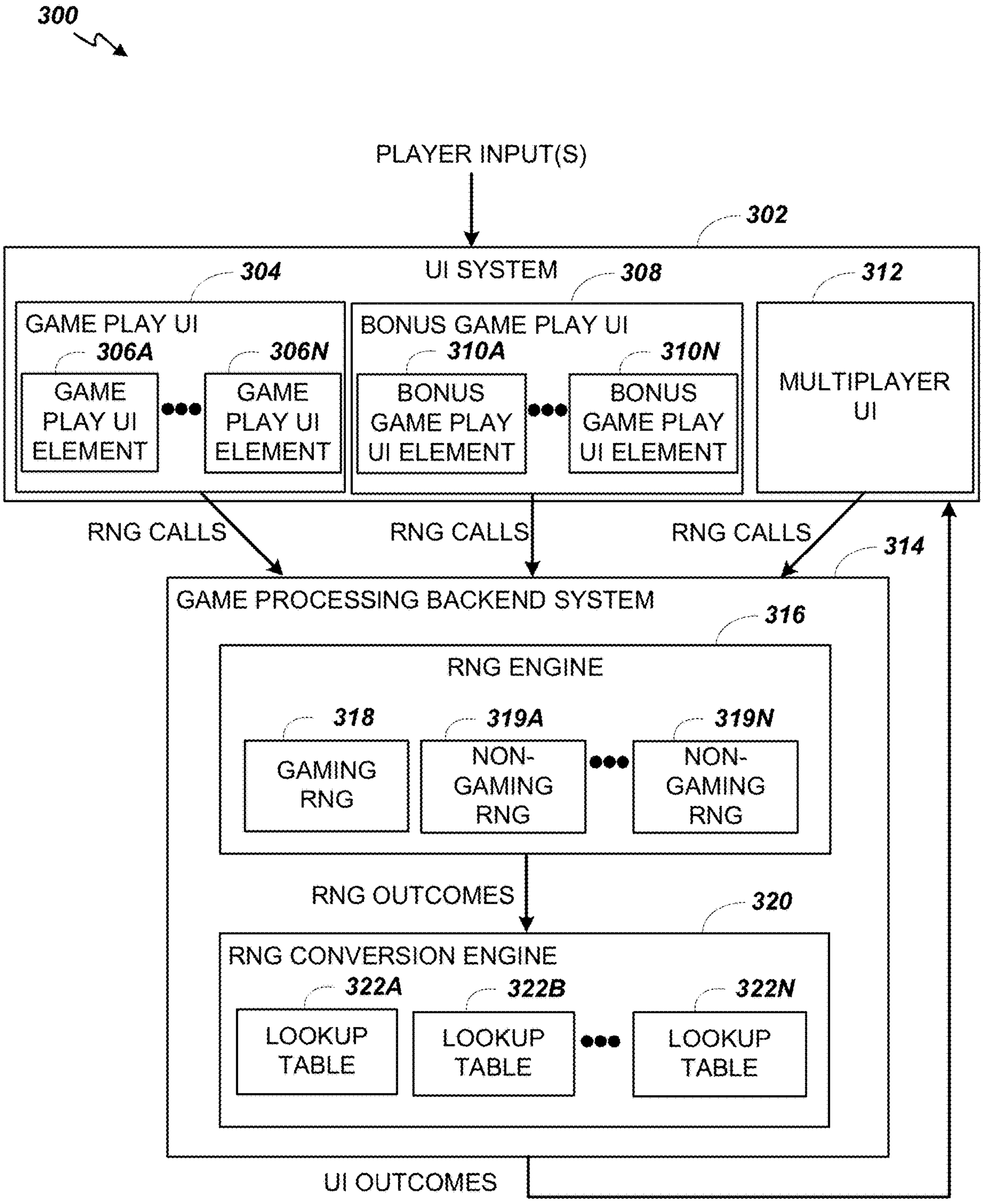
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
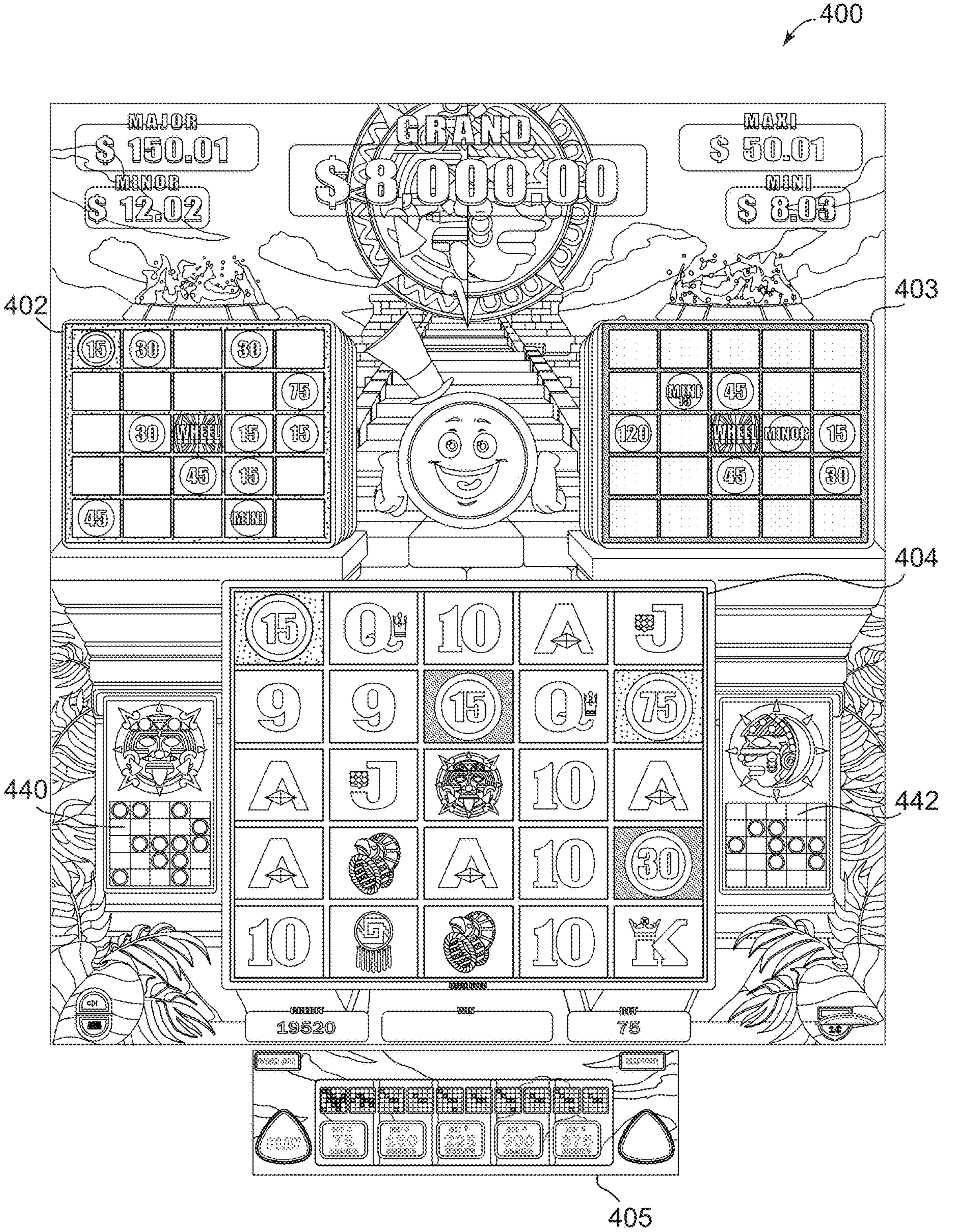
FIG. 4A is a user interface of an example wagering game, in which two bingo cards are displayed in conjunction with a reel window having a plurality of reels and an input window for a plurality of wager options.

FIG. 4A shows an example user interface for a wagering game 400, in which a first bingo card 402 and a second bingo card 403 are displayed in conjunction with a reel window having a plurality of reels 404. In the example embodiment, first bingo card 402 has a first color such as a gold color assigned to it and second bingo card 403 has a second color such as a blue color assigned to it. In other embodiments, first bingo card 402 may have a first indicator assigned to it and second bingo card 403 may have a second indicator assigned to it. In FIG. 4A, the indicators on the bingo cards and the prize symbol are shown using different types of stippling. The indicators may be a color, a number, a design feature, or any other indicator that differs between the two or more bingo cards. An input window 405 (e.g., virtual button deck) for a plurality of wager options is also displayed. In the example embodiment, a repeat first bingo card 440, corresponding to first bingo card 402, and a repeat second bingo card 442, corresponding to second bingo card 403, are also displayed. These repeat bingo cards are displayed to at least maximize the real estate usage of the display screen for the player and to make it easier for the player to see what bingo positions are populated. The first bingo card 402, second bingo card 403, reel window for the plurality of reels 404, repeat first bingo card 440, and repeat second bingo card 442 are further illustrated in FIG. 4B. The input window 405 for the plurality of wager options is further illustrated in FIG. 4C. While FIG. 4A depicts an embodiment showing two bingo cards, various embodiments may include a quantity of bingo cards greater than two (e.g., "n" bingo cards).

Figure 4B:
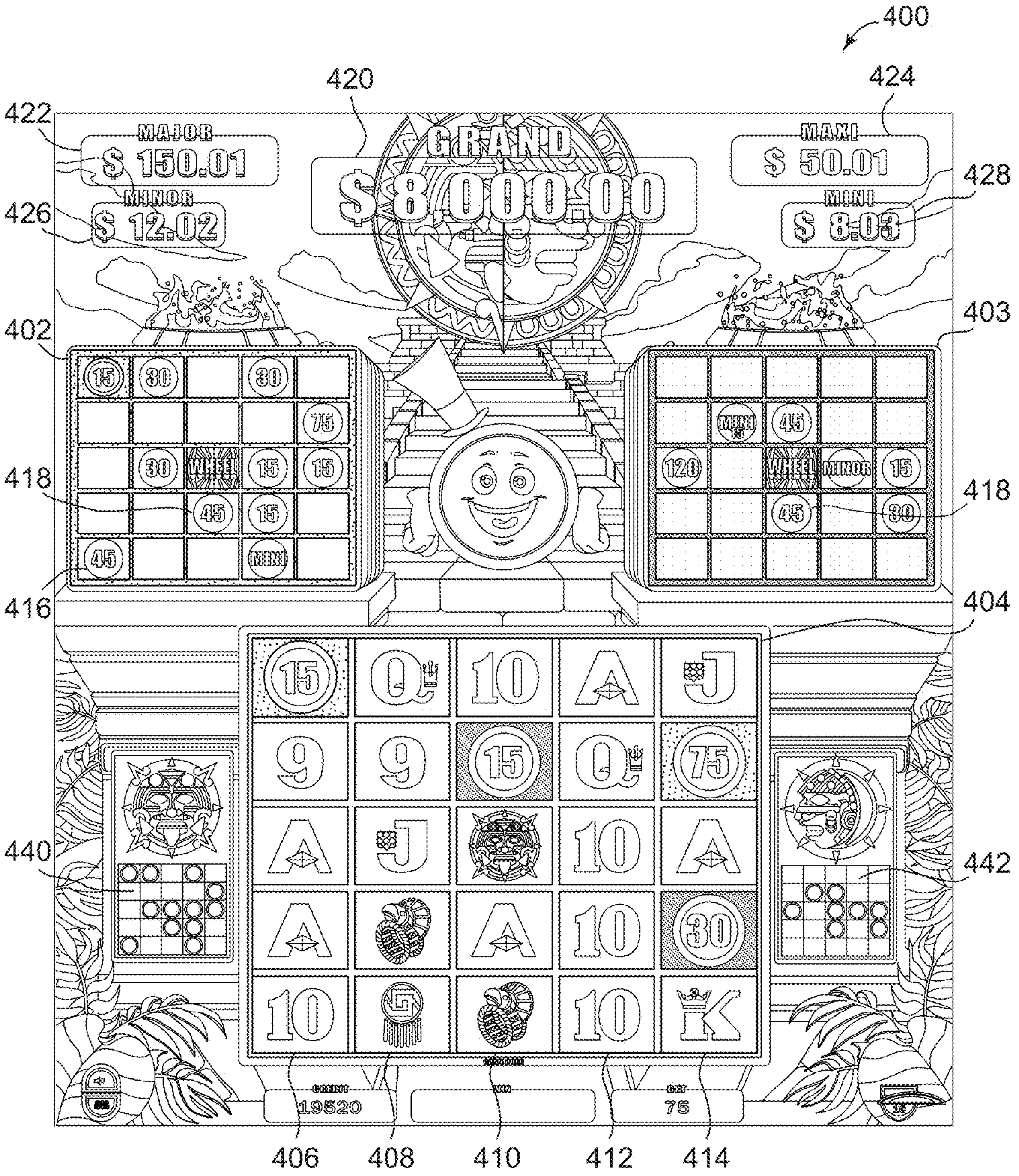
FIG. 4B is a partial screenshot or user interface of the example wagering game of FIG. 4A, illustrating the two bingo cards and the reel window having a plurality of reels.

In the example embodiment, as shown in FIG. 4B, the reel window (not separately numbered) includes a first reel 406, a second reel 408, a third reel 410, a fourth reel 412, and a fifth reel 414, collectively referred to herein as "reels 404," only portions of which are shown here. However, any suitable number of reels 404, such as one reel to reels numbering greater than five reels, may be implemented on a variety of embodiments. Wagering game 400 also visually includes a first bingo card 402 and a second bingo card 403, although, as described in detail below, in the example embodiment, no bingo number listing or "ball call" may be provided. Rather, first bingo card 402 and second bingo card 403 may be modified based upon one or more outcomes appearing on reels 404. Stated another way, first bingo card 402 and second bingo card 403 may not be matched or "daubed" based upon a random bingo number listing or ball call, but played in conjunction with and modified based upon one or more reel outcomes appearing on reels 404. In other words, certain positions on the bingo cards correspond with or are linked to certain positions on the reel matrix. This is explained in further detail below.

In various embodiments, wagering game 400 may be displayed by and played on one or more gaming devices 104A-104X (as shown in FIG. 1 and FIG. 2A). In other embodiments, wagering game 400 may be played on any other suitable computing device, such as a personal computer, a tablet computing device, a mobile communications device (e.g., a smartphone), and the like. Thus, it will be appreciated that wagering game 400 may be provided in either of a so-called "thick client" or "thin client" version. Although not central to an understanding of the present disclosure, in a thick client embodiment, all or at least a portion of wagering game 400 may be stored on a memory device 210 of an EGM 104A-104X. In contrast, in a thin client embodiment, all or at least a portion of wagering game 400 may be served from a backend server system, such as any of servers 106-114.

Reels 404 may include simulated or "virtual" reels generated and displayed by one or more processors 204 (such as processors of game controller 202) on any game display, such as primary game display 240, secondary game display 242, topper display 216, player tracking interface display 228, and/or any other suitable display device. In other embodiments, reels 404 may include one or more physical or mechanical reels having a display element, such as a liquid crystal display (LCD), capable of displaying one or more symbols during gameplay. In other embodiments, reels 404 may include a plurality of mechanical reels and/or a plurality of mechanical reels overlaid by an LCD panel. In such an embodiment, the LCD panel may be used to display a symbol that corresponds to either or both of the bingo bords displayed.

Each reel 406-414 may include a plurality of symbol positions, which may, together, define a matrix of symbol positions. Each symbol position may be designated by a row number (e.g., "1," "2," "3," "4," "5," etc.) and a column letter (e.g., "A," "B," "C," "D," "E," etc.) For example, the upper-left-most symbol position, occurring on reel 406 at the intersection of row 1 and column A, may be designated by the symbol position "1A." In the example embodiment, the matrix of symbol positions is a 5×5 matrix formed from five symbol positions from each of five reels 404. In other embodiments, the matrix of symbol positions may be of other dimensions (e.g., 4×4, 3×3, 4×5, 5×4, or such). In still other embodiments, the matrix of symbol positions may be non-rectangular (e.g., column heights of 3, 5, 5, 5, 3 on five reels).

Each symbol position of each reel 406-414 may also include a symbol. In the exemplary embodiment, some of the symbols of one or more reels 406-414 are "prize" symbols (indicating a prize, such as a cash or credit prize), and some of the symbols of each reel 406-414 are non-prize or "standard" symbols. As used herein, a "standard" symbol may refer to any symbol that is not a prize symbol, where again, a "prize" symbol may include any symbol displaying a cash or credit prize value. As used herein, a "wild" symbol may refer to any symbol capable of substituting, e.g., on a line win or ways to win, for another symbol, including some or all standard symbols and/or value symbols. In some embodiments, one or more "jackpot" symbols may appear and may be used to identify jackpot wins in certain situations described in further detail below.

During a round of gameplay (e.g., after a wager is submitted), each reel 406-414 may be spun and stopped to display a subset of the symbols of each reel 406-414, for example, using RNG engine 316. For example, in at least some embodiments, five symbol positions of each reel 406-414 may be selected and stopped by processor 204 based upon the one or more outcomes of RNG 212 to display five symbols, one in each selected and stopped symbol position, for presentation to a player.

In at least some embodiments, one or more consecutive symbols are selected from each reel 406-414 for presentation. For example, if a symbol at symbol position "1A" is selected by processor 204 for presentation, the symbols at symbol positions "2A" and "3A" may also be selected and displayed.

In addition, in some embodiments, one or more symbol display positions of one or more reels 406-414 may be spun and stopped independently and/or one at a time (or in groups at a time). For example, if one symbol position is spun and stopped at a time, and there are twenty-five symbol positions across the game play matrix, then each symbol position would include a reel that could spin so that all twenty-five reels would spin each time the game is played.

Thus, a plurality of symbols from each of reels 406-414 may be displayed for presentation to a player of wagering game 400. As described above, these symbols may include standard symbols as well as prize symbols. In certain embodiments, the value of prize symbols may be predetermined and preassigned to the reel strips. Various wager amount combinations/denomination levels may use their own reel strips that have prizes of value symbols increase as wager amount and/or denomination level increases. In certain embodiments, certain positions on reel strips may be earmarked for prize value symbols. The value of the symbols may be randomly selected from weighted tables. Further, each denomination and/or wager amount may have a corresponding weighted table of prize values to be used.

First bingo card 402 and second bingo card 403 may include a plurality of bingo positions, which may, together, define a matrix of bingo positions. Each bingo position may be designated by a row number e. "1," "2," "3," "4," "5," etc.) and a column letter (e.g., "A," "B," "C," "D," "E," etc.) For example, the upper-left-most bingo position, occurring at the intersection of row 1 and column A, may be designated by the bingo position "1A."

As a result, in the example embodiment, first bingo card 402 and second bingo card 403 may include a number of bingo positions equal to a number of symbol positions defined by reels 406-414. For example, if there are twenty-five symbol positions on reels 406-414, first bingo card 402 and second bingo card 403 may likewise include twenty-five bingo positions. A one-to-one relationship may, in addition, be defined between each symbol position of reels 406-414 and each bingo position of first bingo card 402 and second bingo card 403. In one example, a one-to-one relationship may be defined between symbol position "1A" and bingo position "1A," whereby, as described herein, symbol position "1A" corresponds to bingo position "1A." The remaining bingo positions may similarly correspond to a respective symbol position of reels 406-414.

In other embodiments, there may be greater or fewer bingo positions than there are symbol positions. In such embodiments, a different reel position to bingo position correspondence may be defined. For example, if there are greater bingo positions than symbol positions, a one-to-many correspondence may be established, whereby a single symbol position may correspond to more than a single bingo position. Conversely, if there are fewer bingo positions than symbol positions, a many-to-one correspondence may be established, whereby a plurality of symbol positions correspond to a single bingo position. These arrangements are merely illustrative, however. It will be appreciated that a variety of other suitable symbol position to bingo position relationships may be established or defined.

In operation, one or more prize symbols appearing on reels 406-414 may be replicated or populated from a position in the matrix of reel positions to a corresponding bingo position in the matrix of bingo positions of first bingo card 402 and/or second bingo card 403 to populate the corresponding bingo position with the prize symbol from the corresponding symbol position. For example, if symbol position "1A" displays a prize symbol after being spun and stopped, the prize symbol may be replicated in bingo position "1A" of first bingo card 402 and/or second bingo card 403 to populate bingo position "1A" with the same prize symbol. In certain embodiments, after the prize symbol(s) is replicated to a position on first bingo card 402 and/or second bingo card 403, the prize symbol may reveal another symbol that may for a part of the paytable used to determine awards based on the outcome reels 404.

In the example embodiment, as shown in FIG. 4B, one or more prize symbols, such as prize symbols 416 and 418 may be pre-populated on first bingo card 402 and/or second bingo card 403 prior to reels 406-414 being spun and stopped. Pre-population of one or more prize symbols on first bingo card 402 and/or second bingo card 403 may be performed to provide a head start to a player of wagering game 400. For example, this may be performed when the player begins a play session, such as when a player deposits a credit balance and makes a first wager. In certain embodiments, pre-population of prize symbols may be activated (e.g., randomly during game play, randomly between spins, after completion of a bonus game, after one or a predetermined quantity of bingo patterns are completed, including but not limited to a specific pattern or any pattern that is in a set of predetermined patterns). Further, at least some bingo positions may be unpopulated (or "vacant") prior to game play (e.g., prior to a gaming session, prior to a particular spin). As described herein, these vacant positions may be populated with prize symbols appearing in symbol positions of reels 406-414. In some embodiments, prize symbols on first bingo card 402 and/or second bingo card 403 persist from one play of the wagering game to the next at a set wager level until one or more bingo patterns are achieved, resulting in persistently-populated prize symbols on first bingo card 402 and/or second bingo card 403 based on the positions populated on first bingo card 402 and/or second bingo card 403 from previous plays at the corresponding wager level. Persistently-populated prize symbols are prize symbols that are populated on the two or more bingo cards at a specific wager level that persist between plays at the corresponding wager level. In some embodiments, prize symbols on first bingo card 402 and/or second bingo card 403 are removed after play of a predetermined quantity of wagering games (e.g., regardless of whether a bingo pattern is formed). In some embodiments, prize symbols persist until either one or more bingo patterns is formed or until a player ends a play session (e.g., by selecting a cash out option). In some embodiments, if a position on a bingo card is pre-populated with a value and that corresponding position on the reel matrix receives a new prize symbol having a value, the value shown on the new prize symbol may be added to the pre-populated value shown on the bingo card, or in other embodiments, the higher of the two values (between the pre-populated value and the new value) is displayed on the bingo card.

In the example embodiment, repeat first bingo card 440 and repeat second bingo card 442 may be displayed at the sides of the reel window. The repeat first bingo card 440, corresponding to first bingo card 402, and repeat second bingo card 442, corresponding to second bingo card 403, may be populated in the same positions as the positions of the first bingo card 402 and second bingo card 403. The prize symbols on repeat first bingo card 440 and repeat second bingo card 442 may not include a numerical value. Repeat first bingo card 440 and repeat second bingo card 442 are provided to efficiently use the real estate space of the user interface while conveniently showing next to the reels the player the populated and unpopulated positions on first bingo card 402 and second bingo card 403. During a play session, the player may track the populated and unpopulated positions on first bingo card 402 and second bingo card 403 by looking at first bingo card 402 and second bingo card 403 in the secondary play area or by looking at repeat first bingo card 440 and repeat second bingo card 442 displayed at the sides of the reel window in the primary play area. In the example embodiment, repeat bingo cards 440 and 442 are associated with the current wager being made to initiate game play. In other words, if the wager amount is changed by the player, repeat bingo cards 440 and 442 are also changed to show the populated and unpopulated positions for that particular wager level.

In the example embodiment, a plurality of jackpots may be displayed across a top edge (or in any other location) of wagering game 400. For example, a first jackpot 420, a second jackpot 422, a third jackpot 424, a fourth jackpot 426, and a fifth jackpot 428 may be provided and displayed. Jackpots 420-428 may, in various embodiments, include progressive jackpots, which it will be appreciated, may be incremented each time a player places a wager may a predefined increment or amount, and which may, as a result, slowly increase towards one or more maximum values. Although five jackpots 420-428 are shown, any other suitable number of jackpots may be included in wagering game 400. In some embodiments, the prize symbols that get displayed on the reels may include one or more of the jackpot indicators, which in turn may be transferred to one or more of the bingo cards.

Further, the symbols appearing on reels 406-414 may be evaluated for one or more winning symbol combinations (e.g., against a paytable of winning symbol combinations), as those of skill in the art will generally appreciate. If a winning symbol combination appears on reels 406-414, a first or "primary" game award may be provided to the player. As described in additional detail herein, a "secondary" game award may be provided in addition to or apart from the primary game award based upon an evaluation of first bingo card 402 and second bingo card 403.

Figure 4C:
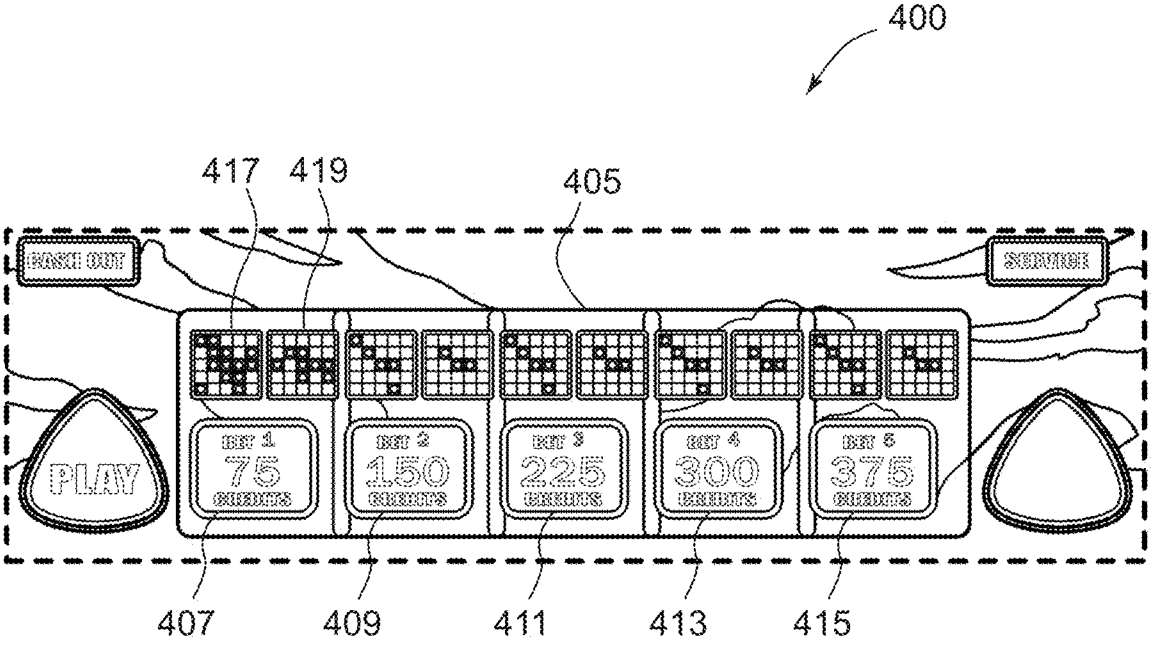
FIG. 4C is a partial screenshot or user interface of the example wagering game of FIG. 4A, illustrating the input window for a plurality of wager options.

In the example embodiment, as shown in FIG. 4C, the input window 405 includes a first wager 407, a second wager 409, a third wager 411, a fourth wager 413, and a fifth wager 415, collectively referred to herein as "wager options." However, any suitable number of wager options, such as one wager option to wager options numbering greater than five wager options, may be implemented on a variety of embodiments. A plurality of different bingo cards may be provided and stored in association with a wager amount at the EGM so that a different player can play the already populated bingo cards of another player that had previously played the game at the same EGM. For example, in the case of the different bingo cards being stored based upon a wager amount of a player 1, a stored first bingo card 417 and a stored second bingo card 419 may be stored for player 1 at a first wager amount at an EGM, and may be displayed when player 1 places wagers of a first amount or level (e.g., a minimum bet). Likewise, two or more additional or intermediate bingo cards may be stored for player 1 at a second wager amount (e.g., intermediate amount), and may be displayed when player 1 places wagers of intermediate amounts or levels (e.g., bets greater than a minimum bet and less than a maximum bet). In addition, a maximum bet set of bingo cards may be stored for player 1 at a third wager amount (maximum bet amount), and may be displayed when player 1 places wagers associated with a maximum bet. These bingo cards may be saved at the EGM so that if a player 2 begins game play at the same EGM after player 1 has stopped playing, player 2 may be assigned the same bingo cards that were previously populated by player 1's game play. In addition, and in some embodiments, one or more wager levels may share a set of bingo cards. For example, a first group of wager levels may share a stored first set of bingo cards, a second group of wager levels may share a stored second set of bingo cards, and so on. Thus, the first set of bingo cards would be persistently stored in memory at an EGM at a first group of wager levels such that when players plays the game and wager at the first wager level, the first set of bingo cards would be retrieved from memory and displayed on the user interface for game play use with any pre-populated positions on those bingo cards shown with the same saved values when displayed. Similarly, this would also occur for the second group of wager levels, and any other levels of wagers. The embodiments described herein include the feature of associating and storing different sets of bingo cards at different wager amounts in either an EGM environment and/or in an online environment. In the EGM or casino environment, the persistent bingo cards could be stored by wager amounts for an EGM or for a player at the EGM, or at a backend server in communication with one or more EGMs within the casino. In the online environment, the persistent bingo cards could be stored by wager amounts for the player at a server that is in communication with a remote or mobile computing device that is used by the player to play the game. Therefore, when wagers are made at different levels during game play, the bingo cards having persistently populated or unpopulated positions that are saved for the different wager levels are retrieved from memory and used for the game play at that selected wager level.

In another embodiment, as shown in FIG. 4C, the input window 405 includes a first wager 407, a second wager 409, a third wager 411, a fourth wager 413, and a fifth wager 415, collectively referred to herein as "wager options." However, any suitable number of wager options, such as one wager option to wager options numbering greater than five wager options, may be implemented on a variety of embodiments. A plurality of different bingo cards may be provided and stored in association with a wager amount for a player at an EGM or a set of EGMs. For example, in the case of the different bingo cards being stored based upon a wager amount of a selected player, a stored first bingo card 417 and a stored second bingo card 419 may be stored for a player at a first wager amount, and may be displayed when the player places wagers of a first amount or level (e.g., a minimum bet). Likewise, two or more additional or intermediate bingo cards may be stored for a player at a second wager amount (e.g., intermediate amount), and may be displayed when the player places wagers of intermediate amounts or levels (e.g., bets greater than a minimum bet and less than a maximum bet). In addition, a maximum bet set of bingo cards may be stored for a player at a third wager amount (maximum bet amount), and may be displayed when the player places wagers associated with a maximum bet. In addition, and in some embodiments, one or more wager levels may share a set of bingo cards. For example, a first group of wager levels may share a stored first set of bingo cards, a second group of wager levels may share a stored second set of bingo cards, and so on. Thus, the first set of bingo cards would be persistently stored in memory for a particular player at a first group of wager levels such that when the player plays the game and wagers at the first wager level, the first set of bingo cards would be retrieved from memory and displayed on the user interface for game play use with any pre-populated positions on those bingo cards shown with the same saved values when displayed. Similarly, this would also occur for the second group of wager levels, and any other levels of wagers. The embodiments described herein include the feature of associating and storing different sets of bingo cards at different wager amounts in either an EGM environment and/or in an online environment. In the EGM or casino environment, the persistent bingo cards could be stored by wager amounts for the player at the EGM or at a backend server in communication with one or more EGMs within the casino. In the online environment, the persistent bingo cards could be stored by wager amounts for the player at a server that is in communication with a remote or mobile computing device that is used by the player to play the game. Therefore, when wagers are made at different levels during game play, the bingo cards having persistently populated or unpopulated positions that are saved for the different wager levels are retrieved from memory and used for the game play at that selected wager level.

In another embodiment, the plurality of different bingo cards may be provided and stored in association with a particular player or player account. For example, a stored first bingo card 417 and a stored second bingo card 419 may be stored for a player by a player account, and may be displayed when the player places a wager or logs into or cards into a game. In other words, when a player identifies themselves to an EGM or backend server hosting this game, the EGM or server may retrieve from memory a set of bingo cards that has been persistently stored in memory with populated and unpopulated positions on the bingo cards based on prior play of the player or based on predetermined conditions (e.g., wager level) of the game. These retrieved bingo cards are then used for game play as described herein.

It will be appreciated that during gameplay, a player may wish to change his or her wager level one or more times (e.g., to accommodate a fluctuating credit balance, etc). In the example embodiment, a bingo card corresponding to the player's current wager level may be retrieved from memory and displayed for the player in the input window in association with reels 406-414. Moreover, if the player has previously placed wagers at the current wager level and one or more prize symbols have accumulated on the corresponding bingo card, the accumulated prized values may be retained or otherwise persist for any suitable duration on the associated bingo card, resulting in persistently-populated prize symbols on the two or more bingo cards. In other words, the populated prize values retained or shown on the bingo cards are persistent so that as a player changes their bet level the populated spots on the bingo cards also change based on what has already been marked at that wager level.

In one embodiment, prize symbols accumulated on a bingo card may persist over a single gaming session (e.g., until a player terminates gameplay) and/or over multiple gaming sessions. If a bingo card that includes accumulated prize symbols persists over multiple gaming sessions, the bingo card or data sufficient to recreate the bingo card may be stored to a backend system, such as bingo server 107, for retrieval during one or more subsequent gaming sessions.

Thus, as a player switches between wager levels, the bingo cards displayed for the player may also be switched, and the prize symbols accumulated thereon during one or more previous spins of reels 406-414 may retained and displayed for the player, even as the player returns from a different wager level associated with a different bingo card to bingo card associated with the current wager level.

One specific improvement to the technical field of wagering games that is accomplished by permitting players to retain prize symbols on two or more bingo cards as players change wager levels is that players may be encouraged to try different wager levels and/or to place larger wagers in intermittent or excited bursts. In addition, players may be more generally encouraged to continue gameplay and/or, in the case of a multi-session game at least, to resume gameplay after taking a break. Players may perceive a variety of advantages as well, such as, for example, the ability to retain bingo cards that have been "worked for," where a change in wager level or the necessity of taking a break might discourage a player from returning to wagering game 400 if bingo card persistence features were not provided. Other technical improvements include at least: (i) managing display real estate when displaying the games; (ii) achieving designated return to player (RTP) by using two or more bingo cards for credit awards in combination with reel symbols that include a first indicator for the first bingo card, a second indicator for the second bingo card, and a combination indicator for both bingo cards; (iii) creating a persistent data structure that is stored in memory that includes the different sets of bingo cards that are stored by player and/or wager levels; (iv) displaying thumbnail versions of the persistently stored bingo cards on the user interface at the different wager levels so that the player can easily see what bingo positions are populated and/or unpopulated at the different wager levels thereby allowing the player to easily understand and select the wager level that the player wants to play at. Other improvements are also further described herein.

Figure 5A:
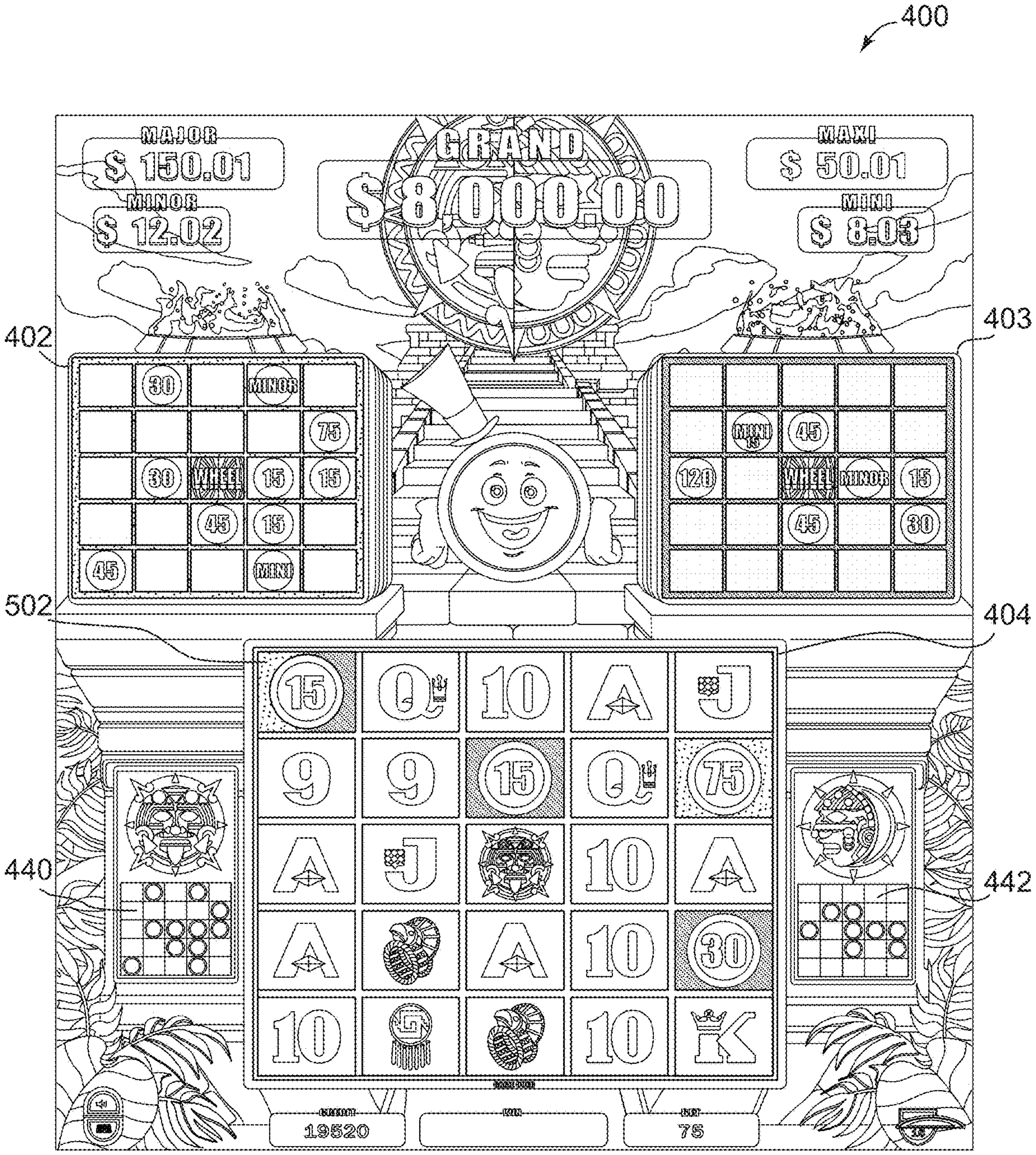
FIG. 5A is a partial user interface of the example wagering game of FIG. 4A, in which two bingo cards are displayed in conjunction with the plurality of reels after an initial spin of the plurality of reels reveals a combination prize symbol.

FIG. 5A is a user interface of a wagering game 400, in which a first bingo card 402 and a second bingo card 403 are displayed in conjunction with a reel window for a plurality of reels 404 after a spin of the plurality of reels 404 reveals a combination prize symbol 502. As shown herein for this particular spin, combination prize symbol 502 is displayed on reel 1 in the top left position—position 1A. This combination prize symbol is displayed based on an output from the RNG as part of game play. In the example embodiment, combination prize symbol 502 may be a combination-colored prize symbol. In other embodiments, combination prize symbol 502 may be a combination indicator prize symbol. The indicator may be a color, a number, a design feature, or any other indicator that differs between the two or more bingo cards. The combination prize symbol 502 may be a combination indicator that matches both a first feature indicator of first bingo card 402 and a second feature indicator of second bingo card 403. As a result of the appearance of combination prize symbol 502 at symbol position "1A," prize symbol 502 may be replicated, translated or transferred, or otherwise populated and displayed at both bingo position "1A" of first bingo card 402 and second bingo card 403. If, however, a prize symbol (such as at position "2E" of reel matrix) was not a combination prize symbol, but rather, a single indicator prize symbol (e.g., just one color and not combination of colors), the prize symbol would then be replicated, translated or transferred, or otherwise populated and displayed at bingo position "2E" of just the one bingo card 402, namely, the one that matches the single indicator of that prize symbol. Accordingly, after a player presses a spin button, the reels spin and an RNG generates an output that helps to determine whether a particular symbol is displayed including a combination prize symbol and/or one or more of a single indicator prize symbol. These displayed prize symbols then cause a similar prize symbol to be displayed on the corresponding positions on one or both of the bingo cards since the positions on the bingo cards are linked or associated with corresponding (or predesignated) positions on the reel matrix. Also, if a bingo position was pre-populated with a value and a new value is displayed on the reel matrix such as at position "2C", then in this case, the new value (e.g., 15) is added to the pre-populated value (e.g., 30) and the total (e.g., 45) is shown in bingo card 403.

Figure 5B:
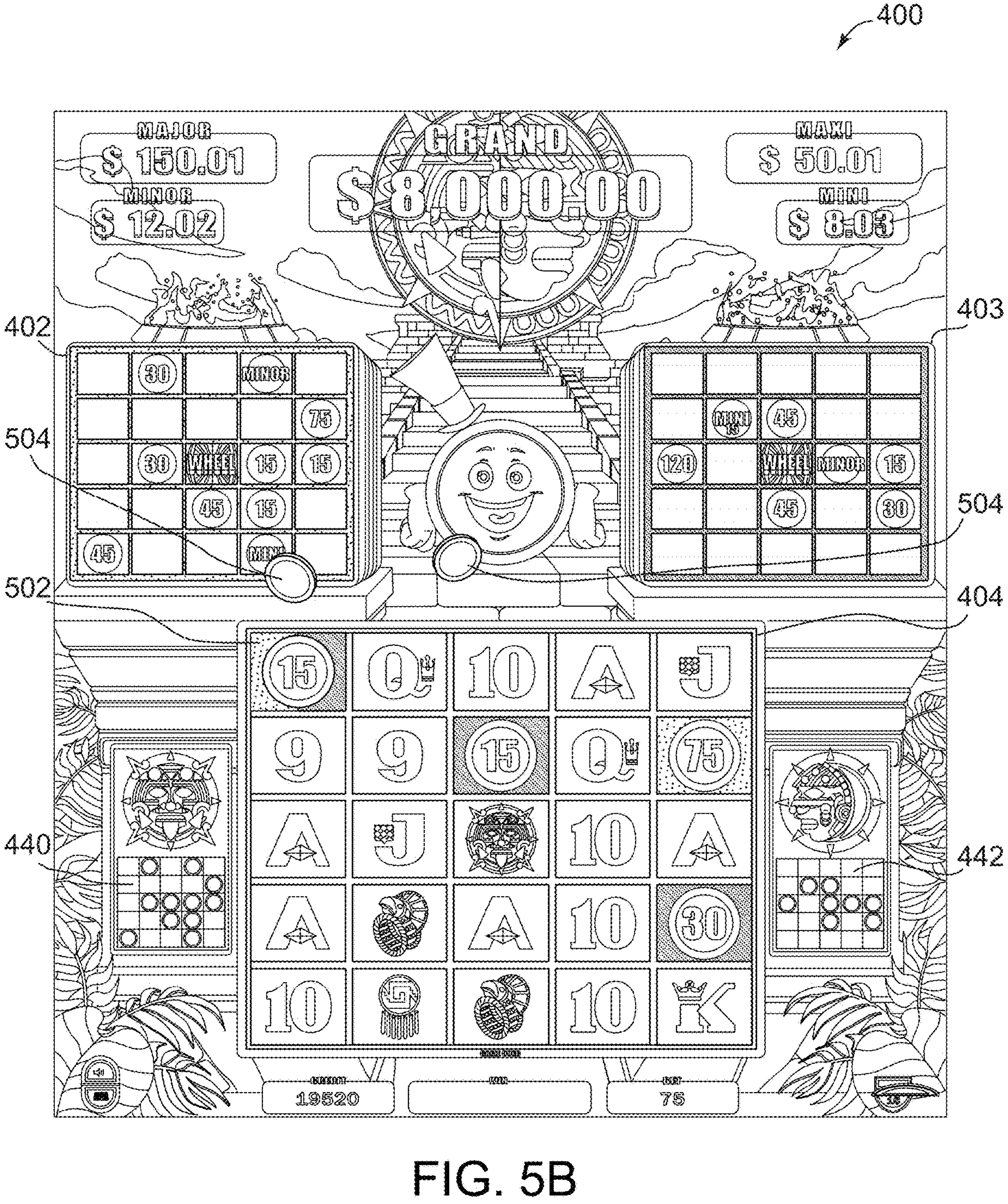
FIG. 5B is a partial user interface of the example wagering game of FIG. 4A, in which a combination prize symbol is in the process of being replicated or populated from a first symbol position of the plurality of reels to corresponding bingo positions on each of the two bingo cards.

In the example embodiment, as shown in FIG. 5B, an animation or graphic, such as a flipping coin 504 may move from symbol position "1A" of the reel matrix to bingo position "1A" on each of the bingo cards 402 and 403 during replication or population of prize symbol 502 to provide a visual cue to a player that prize symbol 502 is being replicated or populated from reels 406-414 to first bingo card 402 and second bingo card 403. In this case, both bingo cards are populated because the prize symbol displayed is a combination prize symbol indicating or relating to both bingo cards.

Figure 5C:
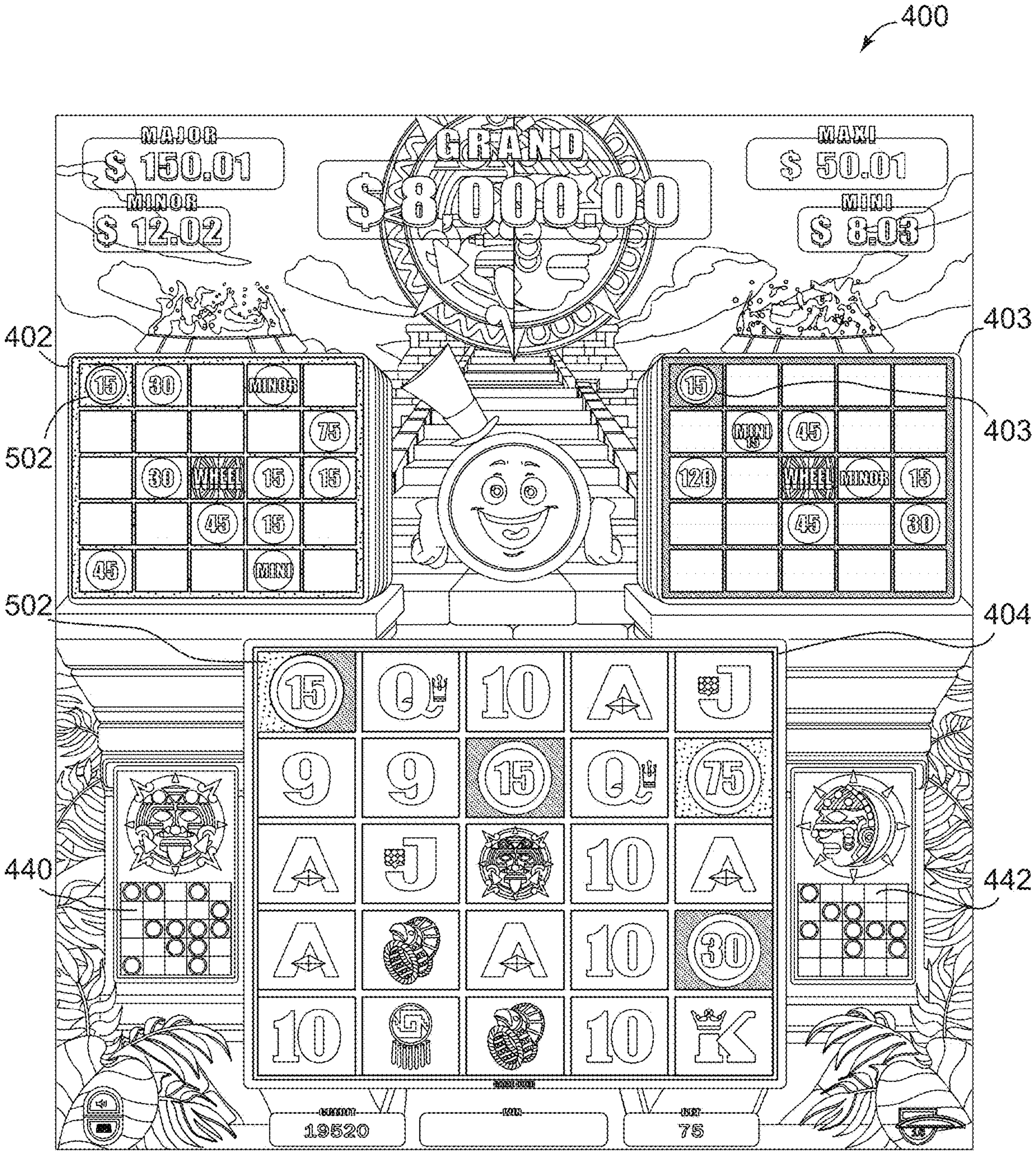
FIG. 5C is a partial user interface of the example wagering game of FIG. 4A, in which a combination prize symbol is replicated or populated from a first symbol position of the plurality of reels to corresponding bingo positions on each of the two bingo cards.

FIG. 5C is a user interface of the example wagering game 400, in which replication of prize symbol 502 from symbol position "1A" of reels 406-414 to bingo position "1A" of first bingo card 402 and second bingo card 403 is completed. Although prize symbols are, in some places, described herein as being replicated from symbol positions to bingo positions, it will be appreciated that other graphics may also be used to indicate transference of a prize symbol from reels 406-414 to first bingo card 402 and second bingo card 403. As described, it will also be appreciated that symbols (e.g., prize symbols as well as other symbols, such as jackpot symbols) may sometimes be replicated, but that other copying or population functions may also be employed, all of which are within the scope of the present disclosure.

For example, in at least one embodiment, a prize symbol may appear to fly off of or otherwise transfer from a symbol position of reels 406-414 and over to a bingo position of first bingo card 402 and second bingo card 403, whereupon the prize symbol may be removed from the symbol position, leaving, for example, a vacant symbol position or exposing a symbol underneath the prize symbol on the vacated symbol position. In another embodiment, symbols displayed on first bingo card 402 and second bingo card 403 may be replicated or transferred back to reels 406-414, exposing symbols thereunder and/or leaving vacated bingo positions as a result.

In one example, a player may achieve a predefined pattern or cluster of symbols on at least one of first bingo card 402 and second bingo card 403, which may trigger replication or placement of one or more symbols in the pattern or cluster of symbol positions of reels 406-414. For instance, a cluster of four wild symbols on at least one of first bingo card 402 and second bingo card 403 may trigger placement of four (or more) wild symbols on reels 406-414, such as randomly in one or more (scattered) symbol positions, which may increase a player's chances of winning an award based upon the symbol evaluation of reels 406-414. Thus, in at least some embodiments, symbols may not simply transfer up from reels 406-414 to first bingo card 402 and second bingo card 403, but down from first bingo card 402 and second bingo card 403 to reels 406-414.

Gameplay may continue in the fashion described above for one or more spins of reels 406-414 until a player either achieves a predefined winning pattern on at least one of first bingo card 402 and/or second bingo card 403, or exhausts all spins in the bonus game without achieving a winning bingo pattern, or ceases game play of wagering game 400 in which case the bingo cards at the wager levels may be saved for when game play is initiated by a another player (picks up where first player left off) or play resumes at a later time by the first player. More particularly, a player may select the "spin" or any of the wager level buttons to place repeated wagers and to cause reels 406-414 to be re-spun each time the spin button is selected. Each time reels 406-414 are re-spun, the combination of symbols appearing on reels 406-414 may be evaluated for one or more winning combinations of symbols, and any prize symbols appearing on reels 406-414 as a result of a spin may be replicated to a corresponding bingo position of first bingo card 402 and second bingo card 403.

The prize symbols populated onto first bingo card 402 and second bingo card 403 during one or more reel spins may thus remain on first bingo card 402 and second bingo card 403 for the duration of multiple spins of reels 406-414. This is to permit accumulation of a plurality of prize symbols on first bingo card 402 and second bingo card 403, whereby, if a predefined winning pattern is formed by the prize symbols accumulated on first bingo card 402 and second bingo card 403, a player may be provided a game award, as described in additional detail below. In some embodiments, when a new prize symbol is populated onto an already-populated bingo position of at least one of first bingo card 402 and second bingo card 403, the new prize may be added to or multiplied by the current prize appearing in that bingo position, or the higher of the two values may be displayed in that bingo position. Specifically, in some embodiments, the new prize symbol may replace the already-populated prize symbol at that bingo position. In some of these embodiments, the replacement may be based on a comparison of the value of the new prize symbol and the value of the already populated prize symbol (only if the prize symbol is greater, lesser, etc.). In one or more of these embodiments, the replacement or addition/multiplication may only occur for a predetermined quantity of instances, after which the symbol is "locked" and cannot be added to or replaced.

Figure 6A:
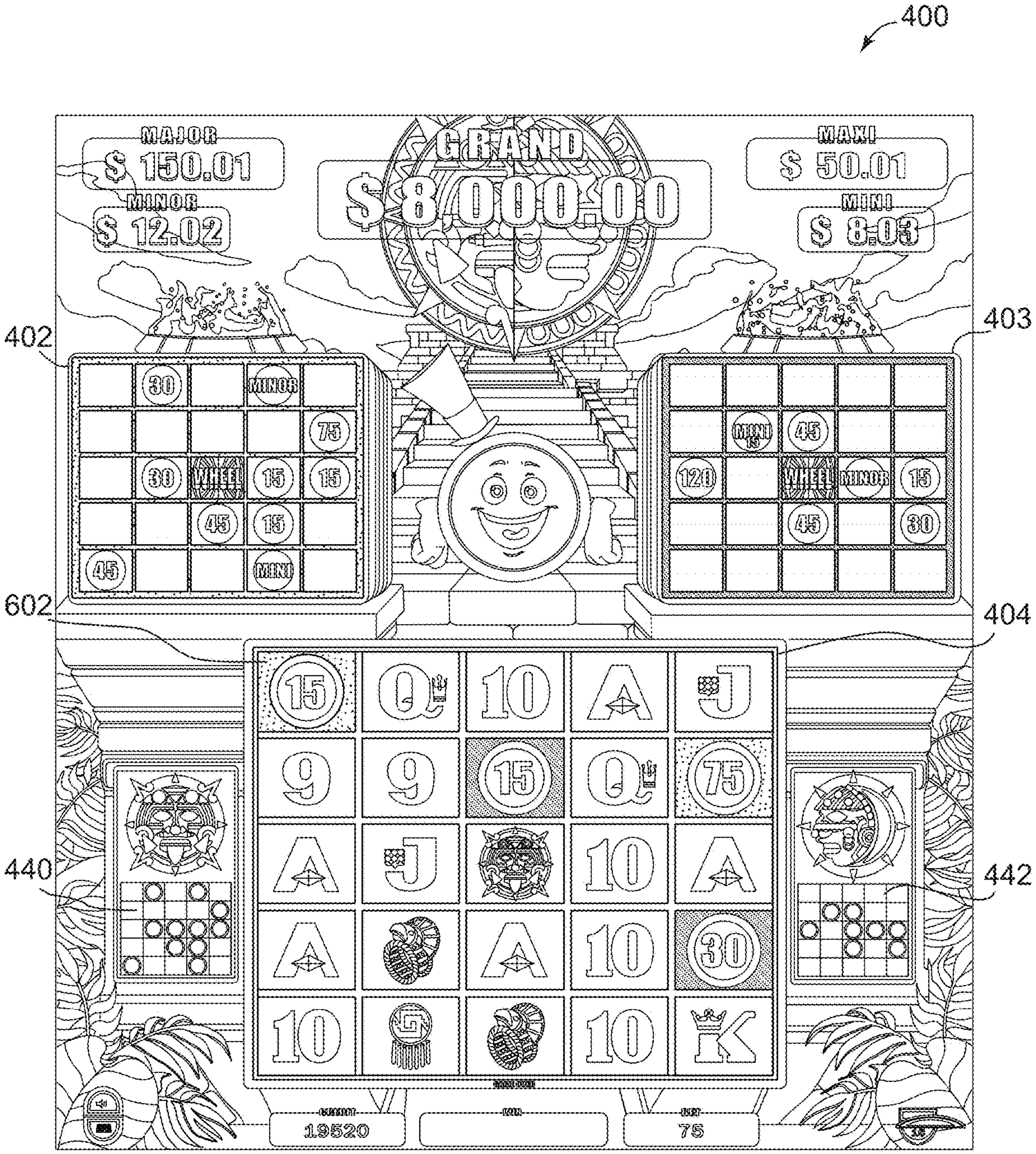
FIG. 6A is a partial user interface of the example wagering game of FIG. 4A, in which the two bingo cards are displayed in conjunction with the plurality of reels after an initial spin of the plurality of reels reveals a single-indicator prize symbol associated with one of the two bingo cards.
Figure 6B:
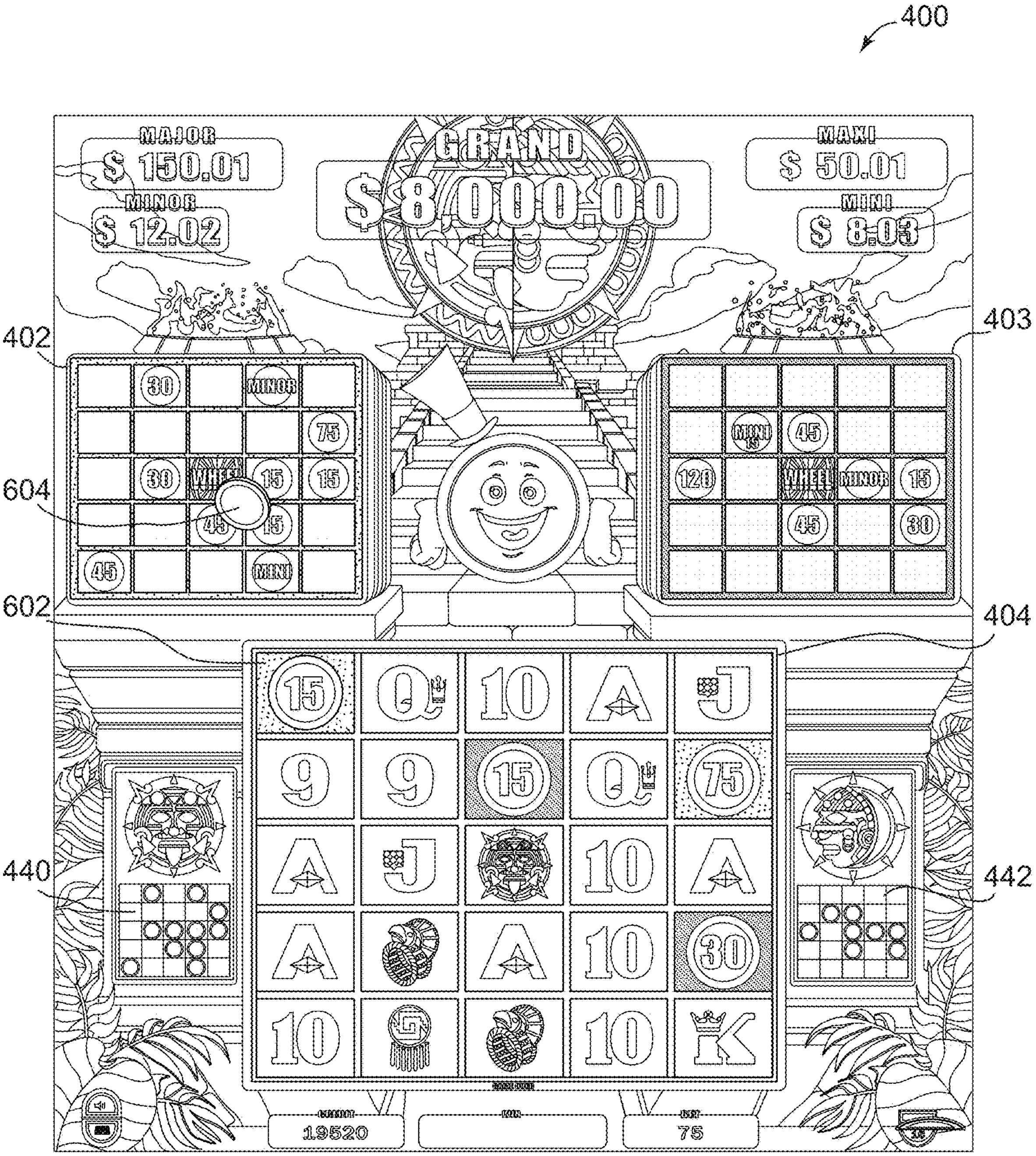
FIG. 6B is a partial user interface of the example wagering game of FIG. 4A, in which a single-indicator prize symbol is in the process of being replicated or populated from a first symbol position of the plurality of reels to a corresponding bingo position on the corresponding bingo card.

FIG. 6A is a user interface of a wagering game 400, in which first bingo card 402 and second bingo card 403 are displayed in conjunction with a reel window for plurality of reels 404 after an initial spin of the plurality of reels 404 reveals a single indicator prize symbol 602 associated with first bingo card 402. Prize symbol 602 may include a single indicator that matches one of a first feature indicator of first bingo card 402 and a second feature indicator of second bingo card 403. In the example embodiment, prize symbol 602 may be a single-colored prize symbol. In other embodiments, prize symbol 602 may be an indicator other than color, such as shape, pattern, etc. An indicator may be a color, a number, a design feature, or any other indicator that differs between the two or more bingo cards. In the case of FIG. 6A, the background stippling of symbol position "1A" matches the stippling of first bingo card 402. As a result of the stippling appearance of prize symbol 602 at symbol position "1A," prize symbol 602 is replicated, translated or transferred, or otherwise populated and displayed at bingo position "1A" of first bingo card 402. In the example embodiment, as shown in FIG. 6B, an animation or graphic, such as a flipping coin 604 may move from symbol position "1A" to bingo position "1A" of first bingo card 402 during replication or population of prize symbol 602 to provide a visual cue to a player that prize symbol 602 is being replicated or populated from reels 406-414 to first bingo card 402. The prize value shown in this symbol position (15) is then displayed in the same position on bingo card 402. And, thus, if bingo card 402 results in a winning pattern and this prize value is part of the winning pattern, this prize value will be awarded along with other prize values in the winning pattern to the player.

Figure 6C:
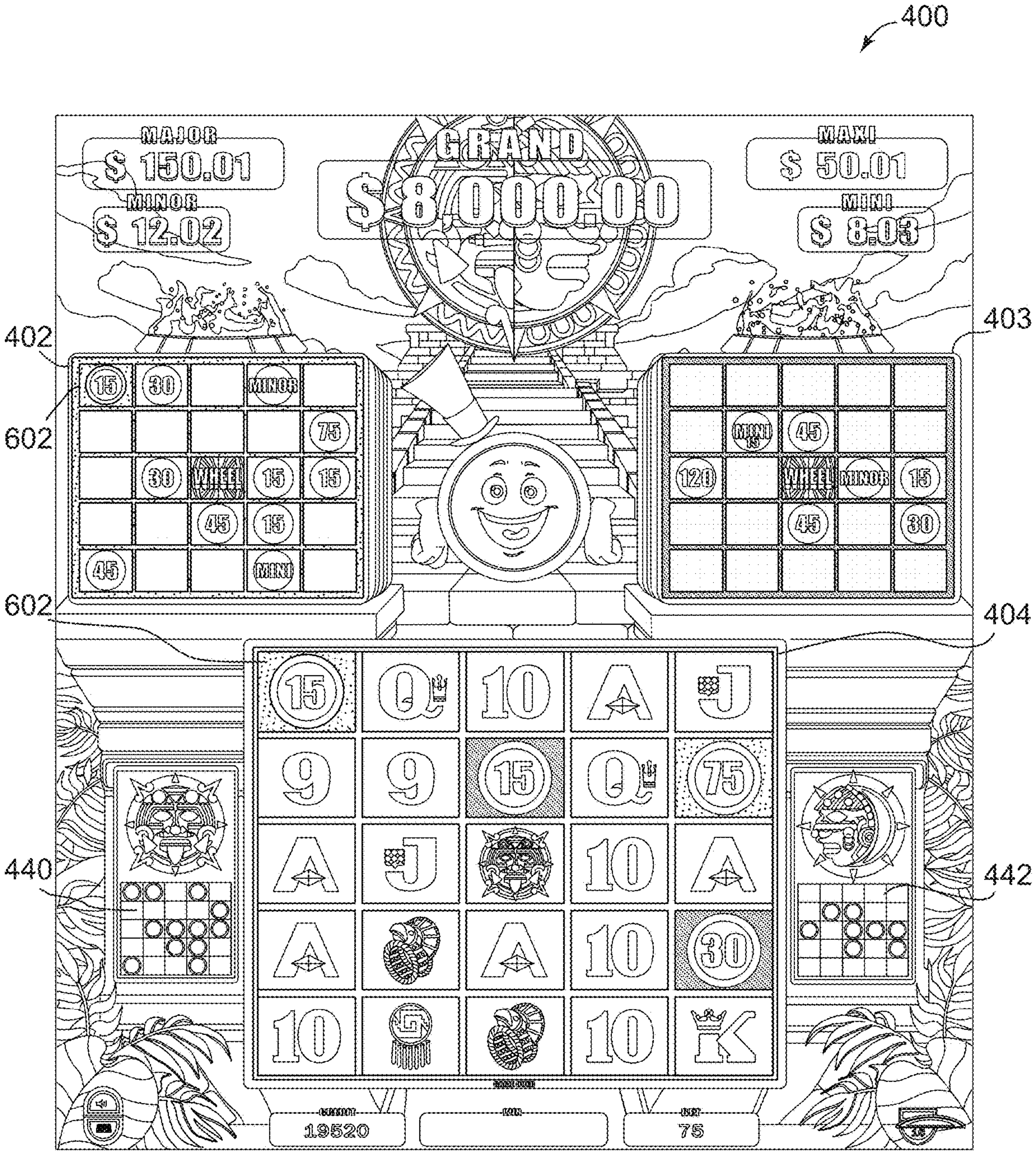
FIG. 6C is a partial user interface of the example wagering game of FIG. 4A, in which a single-indicator prize symbol is replicated or populated from a first symbol position of the plurality of reels to a corresponding bingo position on the corresponding bingo card.

FIG. 6C is a user interface of the example wagering game 400, in which replication of prize symbol 602 from symbol position "1A" of reels 406-414 to bingo position "1A" of first bingo card 402 is completed. Thus, the prize value (15) shown in position "1A" of the reel matrix is copied over to corresponding position "1A" of first bingo card 402. In addition, FIG. 6C also shows other prize symbols being carried over from the reel matrix to one or the other of the bingo cards 402 and 403. For example, symbol position "2C" having stippling that matches second bingo card 403 has a prize value (15) that has been transferred to position "2C" of bingo card 403, which in turn had a pre-populated value already shown (30) so that the new value (15) was added to the pre-populated value (30) resulting in the total value (45) being displayed in the bingo card. Positions "2E" and "4E" are also shown in the reel matrix and in the corresponding locations on the bingo cards.

Figure 7:
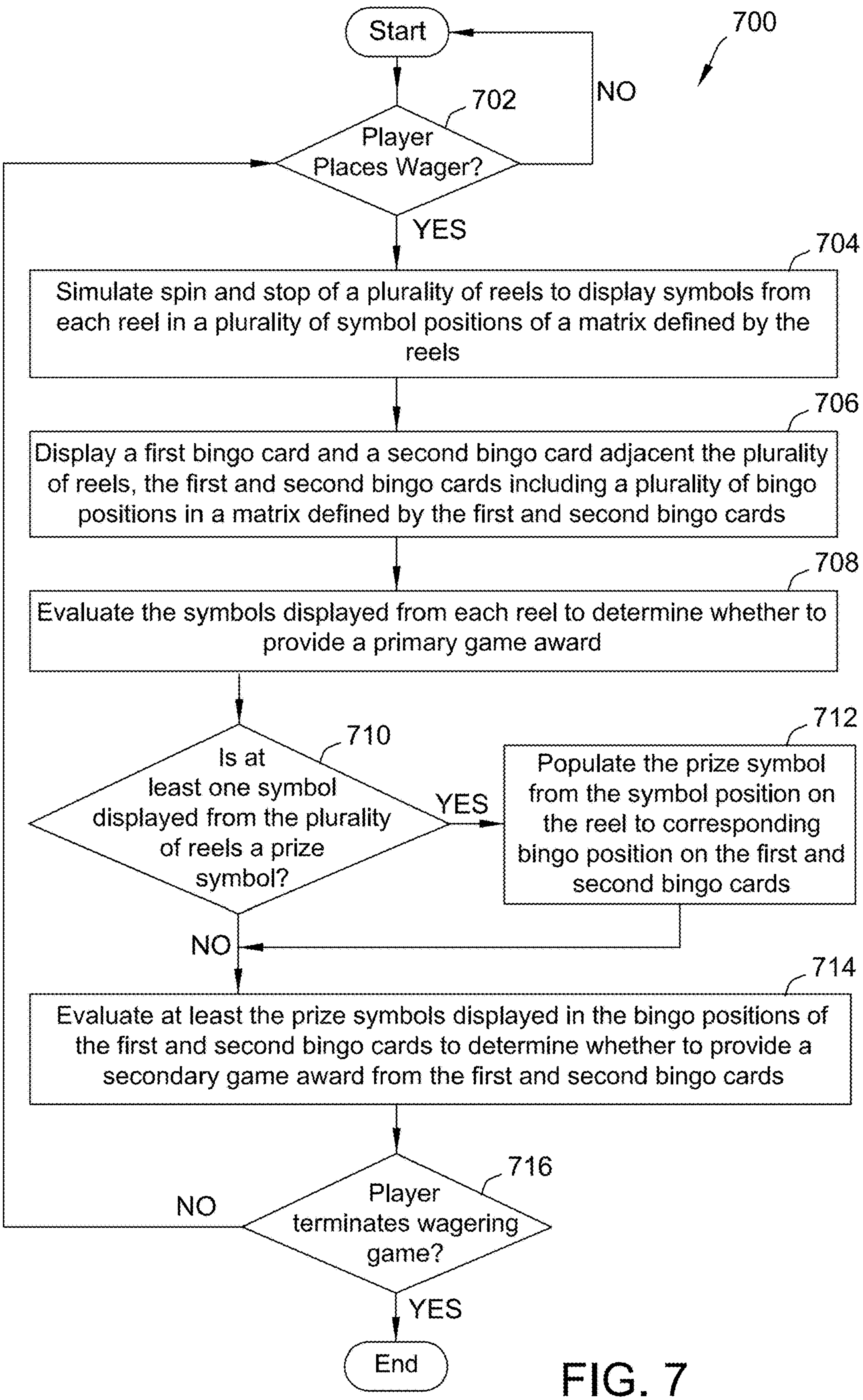
FIG. 7 is a flowchart illustrating a process for playing the wagering game of FIG. 4A.

FIG. 7 is a flowchart illustrating and summarizing a process 700 for playing wagering game 400. Process 700 may be executed by game controller 202 by executing instructions stored in memory 208. Accordingly, in the example embodiment, wagering game 400 may be initiated in response to a player placing a wager, such as, for example, using a "spin" button or one of the wager level buttons as described herein (block 702). Further, in response to a player wager, reels 406-414 may be simulated to spin and stop based upon an output from RNG 212, whereby symbols from each reel may be displayed in a plurality of symbol positions of a matrix defined by reels 406-414 (block 704).

During game play, processor 204 causes the bingo cards, such as first bingo card 402 and/or second bingo card 403, to be displayed adjacent or in proximity to reels 406-414, where first bingo card 402 and second bingo card 403 each include a plurality of bingo positions. The bingo positions of each bingo card 402/403 being associated with or linked to symbol positions with the reels 406-414 (block 706). These cards are displayed showing any pre-populated and/or unpopulated bingo positions on each of these bingo cards resulting from previous spins or from being pre-populated by processor 204.

As described herein, each bingo position may correspond to one or more symbol positions of reels 406-414. In the example embodiment, the number of symbol positions in the matrix of symbol positions is equal to the number of bingo positions in the matrix of bingo positions, and there is a one-to-one correspondence between bingo positions on each bingo card displayed and the symbol positions of the reel matrix.

Moreover, after simulating the spin and stop of reels 406-414 based on an RNG output, the symbols displayed from each reel 406-414 may be evaluated against a paytable stored in memory to determine whether to provide a primary game award (or primary game awards) (block 708). As described herein, one or more combinations of symbols appearing on reels 406-414 may be compared to a paytable to determine whether to provide one or more primary game awards.

In the example embodiment, if at least one symbol displayed from reels 406-414 is a prize symbol (or, in at least some embodiments, a jackpot symbol), the prize value of the displayed prize symbol (or jackpot symbol) may be replicated or populated from the symbol position of reels 406-414 to the corresponding bingo position of at least one of first bingo card 402 and second bingo card 403 (blocks 710 and 712). As explained above, the prize symbol will also include a bingo card indicator indicating which bingo card or cards the prize symbol will be transferred to. For example, if the displayed prize symbol includes an indicator corresponding with first bingo card 402, then the prize symbol value is transferred to the corresponding position on first bingo card 402. If, however, the prize symbol includes an indicator corresponding with second bingo card 403, then the prize symbol value is transferred to the corresponding position on second bingo card 403. And if the displayed prize symbol includes a combination indicator corresponding with both first bingo card 402 and second bingo card 403, then the prize symbol value is transferred to the corresponding position on both first bingo card 402 and second bingo card 403. This can be done on n-number of bingo cards.

Similarly, if multiple prize symbols (or jackpot symbols) are displayed from reels 406-414 after spinning and stopping reels 406-414, all or a subset of the prize and/or jackpot symbols may be populated from reel positions of reels 406-414 to corresponding bingo positions of at least one of first bingo card 402 and second bingo card 403 based upon which indicator is included with the prize symbol being displayed on the reel matrix.

After each spin of reels 406-414, at least one of first bingo card 402 and second bingo card 403 may be evaluated to determine whether to provide a secondary game award (or awards) (block 714). For example, as described above, the prize symbols displayed on first bingo card 402 and second bingo card 403 may be evaluated to determine whether one or more predefined winning patterns are formed by the prize symbols. If so, one or more secondary awards may be provided. Likewise, if one or more jackpot symbols are included in the one or more predefined winning patterns (or in some embodiments, even if the jackpot symbols are not included in any winning pattern), one or more jackpots 420-428 may be provided. In the example embodiment, the prize symbols are total up including any jackpot awards along the bingo winning pattern, and are awarded to the player as part of the bonus or feature game. Finally, a player may decide whether he or she wishes to either end or terminate wagering game 400 and/or continue gameplay by placing additional wagers (blocks 716 and 702) and spinning the reels. If the player ends the game play while positions on the bingo cards are still populated, the current state of the bingo cards at the different wager levels may be saved in the system so that when another player or the same player initiates game play again at a later time, the current state of the bingo cards can be retrieved and play can be picked up from where the last player left off. This feature of storing the bingo cards at wager levels may be done at the EGM level or at the player level. In other embodiments, when game play is ended by the player, the current bingo cards are cleared out and new bingo cards are used when play is reinitiated.

If, however, the player decides to continue gameplay by placing another wager, the player selects the wager level, the corresponding bingo cards are retrieved and displayed, and the reels are spun for the next game instance.

In certain embodiments, first bingo card 402 and second bingo card 403 are not displayed separately in a separate area as in FIGS. 4A, 4B, 5A-5C, and 6A-6C. Rather, any prize symbols 416 that appear on reels 404 in game outcomes are held in the matrix of reel positions on the reels 404 for subsequent plays of the game. As such, if predefined winning patterns are formed in the reel window of reels 404 from the prize symbols, a secondary game award, such as an aggregate award determined by adding the values of each prize symbol in the pattern, may be provided to a player of the wagering game, and may subsequently clear all of the prize symbols 416 from the reel window. In some of these embodiments, the prize symbols that are held in place can be used to form an outcome of a play of a game. In some embodiments, the prize symbols that are held in place cannot be used to form an outcome of a play of a game.

In certain embodiments, two or more bingo cards, such as first bingo card 402 and second bingo card 403, may be displayed adjacent or in proximity to reels 406-414. Further, there may be different type of prize symbols that are displayed at symbol positions on reels 406-414, each type of prize symbol corresponding to one of the multiple bingo cards. For example, there may be three bingo cards displayed, a red bingo card, a blue bingo card, and a gold bingo card. Further, there may be three types of prize symbols having three different indicators (e.g., red prize symbols, blue prize symbols, and gold prize symbols). When a red prize symbol is displayed on reels 406-414, it may be replicated to the red bingo card. When a blue prize symbol is displayed on reels 406-414, it may be replicated to the blue bingo card. When a gold prize symbol is displayed on reels 406-414, it may be replicated to the gold bingo card. When a combination prize symbol is displayed such as a red/blue combination, a red/gold combination, a blue/gold combination, or a red/blue/gold combination, the prize symbols may be replicated on each of the corresponding, different colored bingo cards. Each type of prize symbols and bingo cards may correspond to a different range of prizes, including the jackpots.

In certain embodiments, after a winning pattern is formed in one of the one or more bonus bingo cards, then the particular bonus bingo card is cleared, after providing the bonus win based on the values associated with the symbols collected on the bonus bingo card. However, the remaining of the one or more bonus bingo cards are not cleared and any collected prize symbols persist for the next play of the game.

In certain embodiments, after a winning pattern is formed in one of the one or more bonus bingo cards, then the particular bonus bingo card is cleared, after providing the bonus win based on the values associated with the symbols collected on the bonus bingo card, and any remaining bonus bingo cards of the one or more bonus bingo cards are also cleared of any collected prize symbols.

In certain embodiments, only the prize values that form the winning bingo pattern are removed and other remaining prize values persist for the next play of the game.

In certain embodiments, one or more bonus bingo cards may be cleared after a predetermined quantity of plays of the base game. For example, bonus bingo card 402 may be cleared after every 10 paid spins, irrespective of whether a winning pattern has been formed in those 10 spins. However, if a winning pattern is formed in less than 10 spins, then the bingo card may be cleared earlier, or only those positions that form the winning pattern may be cleared. Bingo bonus card 403 may be cleared after a different predetermined quantity of spins, such as fifteen.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

a display device;

a memory device; and a processor configured to execute instructions stored in the memory device, which when executed, cause the processor to at least:

control the display device to display a matrix of symbol positions formed by a plurality of reels, each reel of the plurality of reels including a plurality of symbol positions, the matrix of symbol positions defining a primary play area;

control the display device to display a first bingo card and a second bingo card defining a secondary play area, the first bingo card being associated with a first feature indicator and the second bingo card being associated with a second feature indicator;

store a first memory structure in the memory device corresponding to the first bingo card and a second memory structure in the memory device corresponding to the second bingo card;

in response to receipt of an input to play an instance of a game, determine an outcome, based at least in part on an output of a random number generator (RNG), that includes a first plurality of symbols to display in the primary play area;

in response to determining that the first plurality of symbols includes a first prize symbol having a first prize symbol indicator and a value, determine whether the first prize symbol indicator of the first prize symbol corresponds to the first feature indicator, the second feature indicator, or a combination of the first feature indicator and second feature indicator;

in response to determining that the first prize symbol indicator corresponds to the first feature indicator, update the first memory structure to include a prize value that corresponds to the value of the first prize symbol and populate a position on the first bingo card with the first prize symbol;

in response to determining that the first prize symbol indicator corresponds to the second feature indicator, update the second memory structure to include a prize value that corresponds to the value of the first prize symbol and populate a position on the second bingo card with the first prize symbol; and in response to determining that the first prize symbol indicator corresponds to the combination of the first feature indicator and the second feature indicator, populate a position on each of the first bingo card and the second bingo card with the first prize symbol.

2. The electronic gaming device of claim 1, wherein the instructions further cause the processor to at least:

evaluate the first bingo card of the secondary play area against a plurality of predefined winning bingo patterns to determine that a predefined winning bingo pattern is formed in the secondary play area; and in response to determining that the predefined winning bingo pattern is formed, determine an award value based at least in part on the values of prize symbols forming the predefined winning bingo pattern in the secondary play area including the first prize symbol.

3. The electronic gaming device of claim 1, wherein the instructions further cause the processor to at least:

evaluate the second bingo card of the secondary play area against a plurality of predefined winning bingo patterns to determine that a predefined winning bingo pattern is formed in the secondary play area; and in response to determining that the predefined winning bingo pattern is formed, determine an award value based at least in part on the values of prize symbols forming the predefined winning bingo pattern in the secondary play area including the first prize symbol.

4. The electronic gaming device of claim 1, wherein the instructions further cause the processor to at least:

evaluate the first and second bingo cards of the secondary play area against a plurality of predefined winning bingo patterns to determine that multiple predefined winning bingo patterns are formed in the secondary play area; and in response to determining that the predefined winning bingo patterns are formed, determine an award value based at least in part on the values of prize symbols forming the predefined winning bingo patterns in the secondary play area including the first prize symbol.

5. The electronic gaming device of claim 1, wherein the instructions further cause the processor to at least:

in response to determining that the first prize symbol indicator corresponds to the combination of the first feature indicator and the second feature indicator, cause to be displayed an animation of the first prize symbol transferring onto each of the first and second bingo cards to a position on the bingo cards that corresponds to the position of the first prize symbol in the primary play area to provide a visual cue of the first prize symbol being replicated onto each of the first and second bingo cards.

6. The electronic gaming device of claim 1, wherein a number of positions on each of the first and second bingo cards is equal to a number of symbol positions defined by the matrix of symbol positions, wherein each bingo position on the first and second bingo cards corresponds in a one-to-one relationship to a symbol position of the matrix of symbol positions.

7. The electronic gaming device of claim 1, wherein the instructions further cause the processor to at least:

in response to receipt of another input to play another additional play of the game, determine an additional outcome that includes pluralities of symbols to display in the matrix of symbol positions;

in response to determining that the additional outcome includes an additional prize symbol having an additional prize symbol indicator and a second value in the primary play area, populate a position on both the first bingo card and the second bingo card with the second value of the additional prize symbol based on the additional prize symbol indicator matching the first feature indicator of the first bingo card and the second feature indicator of the second bingo card;

additionally evaluate the first and second bingo cards, including the first prize symbol and the additional prize symbol;

determine, based upon the additional evaluation, whether a predefined winning bingo pattern is formed by the first prize symbol and the additional prize symbol on one or more of the first and second bingo cards; and in response to determining that the predefined winning bingo pattern is formed, provide a game award to a player of the electronic gaming device.

8. The electronic gaming device of claim 7, wherein the instructions further cause the processor to aggregate a value of each prize symbol appearing in the symbol positions forming the predefined winning bingo pattern to calculate the game award.

9. The electronic gaming device of claim 1, wherein the memory device is configured to store a plurality of wager options, wherein each wager option includes a wager amount, a persistently-populated first bingo card, and a persistently-populated second bingo card.

10. The electronic gaming device of claim 9, wherein the instructions further cause the processor to at least:

control the display device to display the plurality of wager options in the primary play area; and in response to receipt of an input to select a wager option, control the display device to display the persistently-populated first bingo card and the persistently-populated second bingo card stored with the selected wager option in the secondary play area, the persistently-populated first and second bingo cards stored in the memory device including one or more prize symbols accumulated on the first and second persistently-populated bingo cards from previous game plays at the selected wager option.

11. The electronic gaming device of claim 1, wherein the instructions further cause the processor to control the display device to cause a repeat first bingo card and a repeat second bingo card to be displayed in the primary play area, the repeat first and second bingo cards being populated in the same positions as the positions of the first and second bingo cards.

12. The electronic gaming device of claim 1, wherein the instructions further cause the processor to at least:

determine a wager amount associated with the game;

retrieve, from the memory device, a first previously-populated bingo card corresponding to the wager amount and a second previously-populated bingo card corresponding to the wager amount; and utilize the first previously-populated bingo card as the first bingo card and the second previously-populated bingo card as the second bingo card for the instance of the game at the wager amount.

13. An electronic gaming system comprising:

at least one memory device with instructions stored thereon; and at least one processor in communication with the at least one memory device, wherein the instructions, when executed by the at least one processor, cause the at least one processor to:

provide content for a plurality of symbol positions formed by a plurality of reels, each reel of the plurality of reels including a plurality of symbol positions, the symbol positions defining a first area;

provide content for a first bingo card and a second bingo card defining a second area, the first bingo card being associated with a first feature indicator and the second bingo card being associated with a second feature indicator;

store a first memory structure in the memory device corresponding to the first bingo card and a second memory structure in the memory device corresponding to the second bingo card;

based upon receipt of an input to play an instance of a game, determine an outcome, based at least in part on an output of a random number generator (RNG), that includes a first plurality of symbols for the first area;

based upon determining that the first plurality of symbols includes a first symbol having a first symbol indicator and a value, determine whether the first symbol indicator of the first symbol corresponds to the first feature indicator, the second feature indicator, or a combination of the first feature indicator and second feature indicator;

based upon determining that the first symbol indicator corresponds to the first feature indicator, update the first memory structure to include a value that corresponds to the value of the first symbol and populate a position on the first bingo card with the first symbol;

based upon determining that the first symbol indicator corresponds to the second feature indicator, update the second memory structure to include a value that corresponds to the value of the first symbol and populate a position on the second bingo card with the first symbol; and based upon determining that the first symbol indicator corresponds to the combination of the first feature indicator and the second feature indicator, populate a position on each of the first bingo card and the second bingo card with the first symbol.

14. The electronic gaming system of claim 13, wherein the instructions further cause the at least one processor to:

analyze the first bingo card of the second area against a plurality of predefined winning bingo patterns to determine that a predefined winning bingo pattern is formed in the second area; and based upon determining that the predefined winning bingo pattern is formed, determine an output value based at least in part on the values of symbols forming the predefined winning bingo pattern in the second area including the first symbol.

15. The electronic gaming system of claim 13, wherein the instructions further cause the at least one processor to:

analyze the second bingo card of the second area against a plurality of predefined winning bingo patterns to determine that a predefined winning bingo pattern is formed in the second area; and based upon determining that the predefined winning bingo pattern is formed, determine an output value based at least in part on the values of symbols forming the predefined winning bingo pattern in the second area including the first symbol.

16. The electronic gaming system of claim 13, wherein the instructions further cause the at least one processor to:

analyze the first and second bingo cards of the second area against a plurality of predefined winning bingo patterns to determine that multiple predefined winning bingo patterns are present in the second area; and based upon determining that the predefined winning bingo patterns are present, determine an output value based at least in part on the values of symbols forming the predefined winning bingo patterns in the second area including the first symbol.

17. The electronic gaming system of claim 13, wherein the instructions further cause the at least one processor to, based upon determining that the first symbol indicator corresponds to the combination of the first feature indicator and the second feature indicator, provide content for an animation of the first symbol transferring onto each of the first and second bingo cards to a position on the bingo cards that corresponds to the position of the first symbol in the first area to indicate that the first symbol is being replicated onto each of the first and second bingo cards.

18. A non-transitory computer-readable storage medium with instructions stored thereon that, in response to execution by at least one processor, cause the at least one processor to:

configure content for a plurality of symbol positions formed by a plurality of reels, each reel of the plurality of reels including a plurality of symbol positions, the symbol positions defining a first area;

configure content for a first card and a second card defining a second area, the first card being associated with a first feature indicator and the second card being associated with a second feature indicator;

cause storage of a first data structure corresponding to the first card and a second data structure corresponding to the second card;

in response to receipt of an input to play an instance of a game, determine an outcome, based at least in part on an output from a random number generator (RNG), that includes a first plurality of symbols for the first area;

in response to determining that the first plurality of symbols includes a first symbol having a first symbol indicator and a value, determine whether the first symbol indicator of the first symbol is associated with the first feature indicator, the second feature indicator, or a combination of the first feature indicator and second feature indicator;

in response to determining that the first symbol indicator is associated with the first feature indicator, update the first data structure to include a value that is associated with to the value of the first symbol and cause a position on the first card to be populated with the first symbol;

in response to determining that the first symbol indicator corresponds to the second feature indicator, update the second data structure to include a value that corresponds to the value of the first symbol and cause a position on the second card to be populated with the first symbol; and in response to determining that the first symbol indicator is associated with the combination of the first feature indicator and the second feature indicator, cause a position on each of the first card and the second card to be populated with the first symbol.

19. The non-transitory computer-readable storage medium of claim 18, wherein the instructions further cause the at least one processor to:

in response to receipt of another input to play another play of the game, determine an additional outcome that includes pluralities of symbols to display in the first area;

in response to determining that the additional outcome includes an additional symbol having an additional symbol indicator and a second value in the first area, cause a position on both the first card and the second card to be populated with the second value of the additional symbol based on the additional symbol indicator matching the first feature indicator of the first card and the second feature indicator of the second card;

additionally evaluate the first and second cards, including the first symbol and the additional symbol;

determine, based upon the additional evaluation, whether a predefined winning pattern is formed by the first symbol and the additional symbol on one or more of the first and second cards; and in response to determining that the predefined winning pattern is formed, determine a game output.

20. The non-transitory computer-readable storage medium of claim 19, wherein the instructions further cause the at least one processor to aggregate a value of each symbol appearing in the positions forming the predefined winning pattern to determine the game output.

* * * * *